US012755968B2

(12) United States Patent
Dogan et al.

(10) Patent No.: US 12,755,968 B2
(45) Date of Patent: Oct. 6, 2026

(54) GRAPHITE AND DISPERSANT ADDITIVES FOR BATTERY PASTE COMPOSITIONS

(71) Applicant: The Curators of the University of Missouri, Columbia, MO (US)

(72) Inventors: Fatih Dogan, Rolla, MO (US); Julian Kosacki, Rolla, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 833 days.

(21) Appl. No.: 17/687,067

(22) Filed: Mar. 4, 2022

(65) Prior Publication Data

US 2023/0282826 A1 Sep. 7, 2023

(51) Int. Cl.
*H01M 4/58* (2010.01)
*H01M 4/20* (2006.01)
(Continued)

(52) U.S. Cl.
CPC ............... *H01M 4/58* (2013.01); *H01M 4/20* (2013.01); *H01M 4/364* (2013.01); *H01M 4/625* (2013.01);
(Continued)

(58) Field of Classification Search
CPC ........ H01M 4/58; H01M 4/364; H01M 4/625; H01M 10/06; H01M 2004/021;
(Continued)

(56) References Cited

U.S. PATENT DOCUMENTS 5,156,935 A * 10/1992 Hohjo .................. H01M 4/624 429/232
2011/0250500 A1* 10/2011 Ho .......................... H01M 4/62 429/226
(Continued)

FOREIGN PATENT DOCUMENTS

CN 108370071 A * 8/2018 ........... H01M 10/06
EP 0352115 A1 1/1990
JP 2016136517 A * 7/2016

OTHER PUBLICATIONS

Superior Graphite SLC Series product information, FORMULABTTM—superior graphite .. http://www.superiorgraphite.com/wp-content/uploads/2018/05/FormulaBT-Li-ion-Brochure-ilovepdf-compressed.pdf (Year: 2018).*
(Continued)

*Primary Examiner* — James M Erwin
*Assistant Examiner* — Sarah Arimintia Applegate
(74) *Attorney, Agent, or Firm* — Stinson LLP

(57) ABSTRACT

Various graphite additives were incorporated into the positive battery paste composition to compare their effects on the positive active mass utilization of lead-acid batteries. The disclosure is related to battery paste composition for preparing a lead-acid battery plate comprising a graphite additive selected from the group consisting of globular natural graphite, natural flake graphite, expanded flake graphite, and combinations thereof. The disclosure is also related to a battery paste composition comprising a sodium polymethacrylate dispersant. The disclosure is further related to batteries prepared by these battery paste compositions.

16 Claims, 20 Drawing Sheets

(51) Int. Cl.
*H01M 4/36* (2006.01)
*H01M 4/62* (2006.01)
*H01M 10/06* (2006.01)
*H01M 4/02* (2006.01)

(52) U.S. Cl.
CPC ...... *H01M 10/06* (2013.01); *H01M 2004/021* (2013.01); *H01M 2004/028* (2013.01); *H01M 2300/0011* (2013.01)

(58) Field of Classification Search
CPC ... H01M 2004/028; H01M 2300/0011; H01M 4/0404; H01M 4/20; H01M 4/622
See application file for complete search history.

(56) References Cited

U.S. PATENT DOCUMENTS

2012/0248383 A1* 10/2012 Atanassova ........... H01M 4/627 252/506
2012/0251876 A1* 10/2012 Jagannathan ........... H01M 4/14 427/532
2014/0120386 A1* 5/2014 Jagannathan ......... H01M 50/44 977/734
2016/0372727 A1* 12/2016 Guo .................... H01M 4/0404
2018/0294484 A1* 10/2018 Fredrick ............... H01M 4/627

OTHER PUBLICATIONS

Snyders, C., et al., "An Investigation Into the Effect of Carbon Type Additives On the Negative Electrode During the Partial State of Charge Capacity Cycling of Lead Acid Batteries" (2011), Chemistry, Master of Science. Dissertations, Nelson Mandela Metropolitan University. (Year: 2011).*
J. Valenciano, A. SÃ¡nchez, F. Trinidad, A.F. Hollenkamp, Graphite and fiberglass additives for improving high-rate partial-state-of-charge cycle life of valve-regulated lead-acid batteries, Journal of Power Sources,, vol. 158, Issue 2, (Year: 2005).*
M. Fernã¡ndez, J. Valenciano, F. Trinidad, N. MuÃ±oz, The use of activated carbon and graphite for the development of lead-acid batteries for hybrid vehicle applications, Journal of Power Sources,, vol. 195, Issue 14, (Year: 2010).*
Translated CN-108370071-A.*
Roll-to-Roll Advanced Materials Manufacturing DOE Laboratory Consortium—FY 2017 Final Report (https://info.ornl.gov/sites/ publications/Files/Pub107958.pdf) (Year: 2018).*
LBG 8004 Technical Data Sheet https://www.palmerholland.com/getmedia/353010f8-fa0b-43e9-864f-546a7e8a9125/MITM15947 (Year: 2021).*
Superior graphite LBG series product info Jan. 2019 FORMULABTTM—superior graphite .. https://superiorgraphite.com/wp-content/uploads/2019/02/FormulaBT-Lead-Acid.pdf (Year: 2019).*
Roll-to-Roll Advanced Materials Manufacturing DOE Laboratory Consortium—FY 2017 Final Report (https://info.omnl.gov/sites/publications/Files/Pub107958.pdf) (Year: 2018).*
ABG 1045 technical data sheet https://www.palmerholland.com/getmedia/b99d9436-5f4a-421e-80fe-c35268a85979/MITM14222 ( Year: 2021).*
JP-2016136517-A (Machine translation) (Year: 2016).*
Kim, Seon-Guk & Park, Ok-Kyung & Lee, Joong & Ku, Bon-Cheol. (2013). Layer-by-layer assembled graphene oxide films and barrier properties of thermally reduced graphene oxide membranes. Carbon letters. 14. 247-250. 10.5714/CL.2013.14.4.247. (Year: 2013).*
Thomas, B.R, "Linden's Handbook of Batteries," Fourth Edition, McGraw-Hill Education, New York (2011).
Tokunaga, A., et al., "Effect of Anisotropic Graphite on Discharge Performance of Positive Plates in Pasted-Type Lead-Acid Batteries," (1987), Journal of the Electrochemical Society, vol. 134, pp. 525-529.
Tokunaga, A., et al., "Application of Anisotropic Graphite to Sealed Lead-Acid Batteries," (1989), Journal of the Electrochemical Society, vol. 136, No. 1, pp. 33-36, Abstract only.
Trahey, L, et al., "Energy Storage Emerging: A Perspective From the Joint Center for Energy Storage Research," (2020), Proceedings of the National Academy of Sciences (PNAS), vol. 117, No. 23, pp. 12550-12557.
Tuinstra F., et al., "Raman Spectrum of Graphite," (1970), The Journal of Chemical Physics, vol. 53, No. 3, pp. 1280-1281.
Valenciano, J., et al., "Graphite and Fiberglass Additives for improving High-Rate Partial-State-of-Charge Cycle Life of Valve-Regulated Lead-Acid Batteries," (2006), Journal of Power Sources, vol. 158, pp. 851-863.
Wang, S., et al., "Effects of Additives on the Discharge Behavior of Positive Electrodes in Lead/Acid Batteries," (1995), Journal of Power Sources, vol. 55, pp. 47-52.
Weininger, J.L., et al., "Lead-Acid Batteries: Use of Carbon Fiber-Lead Wire Grids at the Positive Electrode," Journal of the Electrochemical Society, vol. 122, Issue No. 9, pp. 1161, Abstract only.
Widrig, J., "Reformer Performance and Tube Life Management," (2016), Nitrogen and Syngas, vol. 339, pp. 38-55.
Wissler, M., "Graphite and Carbon Powders for Electrochemical Applications," (2006), Journal of Power Sources, vol. 156, pp. 142-150.
Wen, Y., et al., "Expanded Graphite as Superior Anode for Sodium-Ion Batteries," (2014), Nature Communications, vol. 5, Article 4033.
Rueschhoff, L., et al., "Additive Manufacturing of Dense Ceramic Parts via Direct Ink Writing of Aqueous Alumina Suspensions," (2016), International Journal of Applied Ceramic Technology, vol. 13, No. 5, pp. 821-830.
Bashtavelova, E. et al., "PbO2 Active Material as an Electrocrystalline Network," (1993), Journal of Power Sources, No. 46, vol. 2, pp. 219-230, Abstract only.
Cho, J.-M. et al., Colloidal Processing of Lead Lanthanum Zirconate Titanate Ceramics, (2001), Journal of Materials Science, vol. 36, No. 10, pp. 2397-2403, first page only.
Dzuy, N.Q. et al., "Direct Yield Stress Measurement with the Vane Method," (1985), Journal of Rheology, vol. 29, No. 3, pp. 335-347, Abstract only.
Dzuy, N.Q. et al., "Yield Stress Measurement for Concentrated Suspensions," (1983), Journal of Rheology, vol. 27, No. 4, pp. 321-349, Abstract only.
Vallat-Joliveau, F., et al., "Some Structural and Textural Aspects of Tribasic Lead Sulfate Precipitation During the Mixing of Lead-Acid Battery Positive Paste", (1995), Journal of The Electrochemical Society, vol. 142, No. 8, pp. 2710-2716, Abstract only.
Ighodaro, O.L., et al., "Ceramic Preforms with 2D Regular Channels for Fabrication of Metal/Ceramic-Reinforced Composites," (2012), International Journal of Applied Ceramic Technology, vol. 9, No. 2, pp. 421-430., Abstract only.
Mezger, T.G., et al., "Applied Rheology: With Joe Flow on Rheology Road," (2018) Anton Paar. GmbH, Abstract only.
Pavlov, D., et al., "Dependence of the Properties of the Lead-Acid Battery Positive Plate Paste on the Processes Occurring During its Production," (1976), Journal of Applied Electrochemistry, vol. 6, No. 4, pp. 339-345, Abstract only.
Awasthi, S., et al., "Formation of Single and Multi-Walled Carbon Nanotubes and Graphene from Indian Bituminous Coal," (2015), Fuel, vol. 147, pp. 35-42.
Bai, L.Z, et al., "A Comparative Study of Electrochemical Performance of Graphene Sheets, Expanded Graphite and Natural Graphite as Anode Materials for Lithium-Ion Batteries," (2013), Electrochimica Acta, vol. 107, pp. 555-561, Abstract only.
Baker, S.V, et al., "The Role of Additives in the Positive Active Mass of the Lead/Acid Cell," (1989), Journal of Power Sources, vol. 27, pp. 127-143.
Bullock K.R., et al., "Chapter 4—Positive-Plate Additives to Enhance Formation and Battery Performance," (2004), Valve-Regulated Lead-Acid Batteries, pp. 109-134, (Publisher Summary only).
Chung, D.D.L., "A Review of Exfoliated Graphite," (2015), Journal of Materials Science, vol. 51, No. 1, pp. 554-568.
Chung, D.D.L, "Review Graphite," (2002), Journal of Materials Science, vol. 37, No. 8, pp. 1475-1489.

(56) References Cited

OTHER PUBLICATIONS

Dada, O.J., "Higher Capacity Utilization and Rate Performance of Lead Acid Battery Electrodes Using Graphene Additives," (2019), Journal of Energy Storage, vol. 23, pp. 579-589.
Daniel, C., et al., "Roll-to-Roll Advanced Materials Manufacturing DOE Laboratory Consortium Project," (2019), U.S. Department of Energy, Advance Manufacturing Office, pp. 1-126.
Derafa, I., et al., "On the Electrochemical Activity of β-Lead Dioxide in Sulfuric Acid Solution: A Comparative Study Between the Chemical and Electrochemical Routes," (2018), Journal of Solid State Electrochemistry, vol. 22, No. 4, pp. 1175-1183, Abstract only.
Dresselhaus, M.S., et al., "Defect Characterization in Graphene and Carbon Nanotubes Using Raman Spectroscopy," (2010), Phil. Trans. R. Society, vol. 368, pp. 5355-5377.
Ebner, E., et al., "Carbon Blacks for Lead-Acid Batteries in Micro-Hybrid Applications—Studied by Transmission Electron Microscopy and Raman Spectroscopy," (2013), Journal of Power Sources, vol. 222, pp. 554-560.
Ferrari, A.C, et al., "Raman Spectroscopy as a Versatile Tool for Studying the Properties of Graphene," (2013), Nature Nanotechnology, vol. 8, pp. 1-26.
Flandrois S., et al., "On the Choice of Carbon Materials at the Negative Electrode of Li-ion Batteries: Graphite vs. Hard Carbons," (2000), Molecular Crystals and Liquid Crystals Science and Technology, vol. 340, pp. 493-498.
Foudia, M., et al., "Effect of a Mineral Additive on the Electrical Performances of the Positive Plate of Lead Acid Battery," (2015), Journal of Power Sources, vol. 279, pp. 146-150, Abstract only.
Ghimbeu, C.M., et al., "Influence of Graphite Characteristics on the Electrochemical Performance in Alkylcarbonate LiTFSI Electrolyte for Li-ion Capacitors and Li-ion Batteries," (2013), Journal of the Electrochemical Society, vol. 160 No. 10, pp. A1907-A1915.
Grey C.P., et al., "Sustainability and in Situ Monitoring in Battery Development," (2016), Nature Materials, vol. 16, pp. 45-56, Abstract only.
Guadagno, L, et al., "Low-Voltage Icing Protection Film for Automotive and Aeronautical Industries," (2020), Nanomaterials, vol. 10, No. 1343, pp. 2-16.
Guerin, K., et al., "Effect of Graphite Crystal Structure on Lithium Electrochemical Intercalation," (1999), Journal of the Electrochemical Society, vol. 146, No. 10, pp. 3660-3665.
H. Kagi, et al., "Proper Understanding of Down-Shifted Raman Spectra of Natural Graphite: Direct Estimation of Laser-Induced Rise in Sample Temperature," (1994), Geochimica et Cosmochimica Acta, vol. 58, pp. 3527-3530.
Heckmann, A., et al., "New Insights into Electrochemical Anion Intercalation into Carbonaceous Materials for Dual-ion Batteries: Impact of the Graphitization Degree," (2018) Carbon, vol. 131, pp. 201-212, Abstract only.
Hickel, J., et al., "Urgent Need for Post-Growth Climate Mitigation Scenarios," (2021), Nature Energy, vol. 6, pp. 1-8.
Takahashi, K., et al., "Physical Changes in Positive Active Mass during Deep Discharge-Charge Cycles of Lead-Acid Cell," (1983), vol. 130, No. 11, p. 2144, Abstract only.
Brochure "Formula BT: Li-ion Batteries", (2018) Superior Graphite.
Ray Masse, In Product Overview, "AvCarb Graphite Felts for Flow Batteries," (2020), AvCarb Material Solutions, 24-Brochure.
Kohs, W., "A Study on Electrolyte Interactions with Graphite Anodes Exhibiting Structures with Various Amounts of Rhombohedral Phase," (2003), Journal of Power Sources, vol. 119-121, pp. 528-537.
Kosacki J., et al., "The Effect of Expanded and Natural Flake Graphite Additives on Positive Active Mass Utilization of the Lead-Acid Battery," (2021), Journal of The Electrochemical Society, vol. 168, No. 12, Abstract only.
Kwasnik, J., et al., "Investigations into the Electrochemistry of Recombinant, Sealed Lead/Acid Batteries," (1993), Journal of Power Sources, vol. 42, Issues 1-2, pp. 165-171.
Lach, J., et al., "Applications of Carbon in Lead-Acid Batteries: A Review," (2019), Journal of Solid State Electrochemistry, vol. 23, pp. 693-705.
Lopes, P., et al., "Past, Present, and Future of Lead-Acid Batteries," (2020), Science (New York, N.Y.), vol. 369, pp. 923, Abstract only.
Mandal, S., et al., "Positive Electrode Active Material Development Opportunities Through Carbon Addition in the Lead-Acid Batteries: A Recent Progress," (2021), Journal of Power Sources, vol. 485, Article ID. 229336, Abstract pnly.
May, G., et al., "Lead Batteries for Utility Energy Storage: A Review," (2018), Journal of Energy Storage, vol. 15, pp. 145-157.
Metzendorf, H. "The Capacity Limiting Role of the Electronic Conductivity of the Active Material in Lead-Acid Batteries During Discharge," (1982), Journal of Power Sources, vol. 7, pp. 281-291, Abstract only.
Moseley, P.T., "Positive Plate Additives," (1997), Journal of Power Sources, vol. 64, Issues 1-2, pp. 47-50, Abstract pnly.
Moseley, P.T., et al., "Understanding the Functions of Carbon in the Negative Active-Mass of the Lead-Acid Battery: A Review of Progress," (2018), Journal of Energy Storage, vol. 19, pp. 272-290.
Pavlov D., et al., "Structural Properties of the PbO2 Active Mass Determining Its Capacity and the "Breathing" of the Posivite Plate During Cycling," (1986), Journal of the Electrochemical Society, vol. 133, No. 2, pp. 241-248, Abstract pnly.
Pavlov, D., "Lead-Acid Batteries," (2011), Science and Technology.
Pavlov, D., et al., "Effect of Chemisorbed Water on the Electrical Capacity of the Lead-Acid Battery Positive Plate, "(1987), Journal of Power Sources, vol. 19, No. 1, pp. 15-25, Abstract only.
Pilot, C., "The Rechargeable Battery Market and Main Trends 2016-2025," (2017), Batteries, 19th Edition, pp. 1-30.
Ponraj, R., et al., "Investigation on Electronically Conductive Additives to Improve Positive Active Material Utilization in ead-Acid Batteries," (2009), Journal of Power Sources, vol. 189 , No. 2, pp. 1199-1203, Abstract only.
Qiu, T., et al., "The Preparation of Synthetic Graphite Materials with Hierarchical Pores from Lignite by One-Step Impregnation and Their Characterization as Dye Absorbents," (2019), RSC Advances, vol. 9, No. 22, pp. 12737-12746.
Salvatore, M., et al., "Synthesis and Characterization of Highly Intercalated Graphite Bisulfate," (2017), Nanoscale Research Letters, vol. 12, No. 1, p. 167.
Sarikaya, A., et al., "Processing, Microstructural Evolution and Electrochemical Performance Relationships in Solid Oxide Fuel Cells" (2013), Materials Science and Engineering, Ph.D. Dissertations, Missouri University of Science and Technology, Rolla, MO.
Seiler, S., et al., "Effect of Friction on Oxidative Graphite Intercalation and High-Quality Graphene Formation," (2018), Nature Communications, vol. 9, pp. 1-9.
Serp, P., "Comprehensive Inorganic Chemistry II From Elements to Applications," (2013), J. Reedijk and K. Poeppelmeier Editors, Elsevier, Amsterdam, pp. 1-3.
Sharma, R., et al., "Determination of Defect Density, Crystallite Size and Number of Graphene Layers in Graphene Analogues Using X-Ray Diffraction and Raman Spectroscopy," (2017), Indian Journal of Pure and Applied Physics, vol. 55, p. 625-629.
Shi, J., et al., "The Application of Rice Husk-Based Porous Carbon in Positive Electrodes of Lead Acid Batteries," (2020), Journal of Energy Storage, vol. 30, Article 101392, Abstract only.
Simon, B., et al., "Hexagonal vs Rhombohedral Graphite: the Effect of Crystal Structure on Electrochemical Intercalation of Lithium lons," (1998), Molecular Crystals and Liquid Crystals Science and Technology, vol. 310, No. 1, pp. 333-340.
Snyders, C., "An Investigation into the Effect of Carbon Type Additives on the Negative Electrode During the Partial State of Charge Capacity Cycling of Lead Acid Batteries," (2011) Dissertation submitted to the Faculty of Science, Nelson Mandela Metropolitan University, Abstract only.
Szcześniak, B., et al., "Performance of Valve-Regulated Lead/Acid Test Cells for Float Operation Using Modified Positive Active Materials," (1994), Journal of Power Sources, vol. 53, No. 1, pp. 119-125, Abstract only.

* cited by examiner

GRAPHITE AND DISPERSANT ADDITIVES FOR BATTERY PASTE COMPOSITIONS

FIELD

The present disclosure is related to battery paste compositions comprising a graphite additive for battery paste compositions for preparing a lead-acid battery plate. The disclosure is further related to dispersant additives for battery paste compositions for preparing a lead-acid battery plate. The disclosure is also related to batteries prepared by using a battery paste composition comprising a graphite additive and/or dispersant additive.

BACKGROUND

The lead-acid battery plays a major role in providing energy for hybrid-electric vehicles, telecommunications, Uninterruptable Power Supplies (UPS), electric grid support, motive power, and a variety of other applications. The lead-acid battery has many intrinsic advantages over other rechargeable battery chemistries. These benefits include cost, recyclability, and safety record. In particular, the lead-acid battery is one of the most cost-effective and safe battery technologies due to the abundancy of its constituent materials and aqueous-based electrolyte. In addition, lead-acid batteries provide an impressive sustainability benefit by being nearly 99% recyclable. However, the specific energy performance of a lead-acid battery leaves significant room for improvement. Specifically, the energy density of a lead-acid battery provides at most 40% of its theoretical capacity, compared to 90% achievable by lithium-ion batteries. A commercial lead-acid battery can generate, on average, only 30 $Wh \cdot kg^{-1}$ of the theoretical 167 $Wh \cdot kg^{-1}$, in large part due to poor positive active material (PAM) utilization. PAM utilization is defined as the ratio of the actual discharged capacity to the stoichiometric amount of capacity.

Therefore, a need exists it the art for improvements in lead-acid battery technology to increase the PAM utilization of lead-acid batteries. There also exists a need for suitable battery paste compositions, for forming the lead-acid batteries, that contribute to increased PAM utilization of the lead-acid battery.

A further need exists in the art for improvements in lead-acid battery technology with respect to the flowability of the battery paste composition used in forming battery plates for a battery. In connection with this need, there is a need for an additive to improve the flowability of the battery paste composition, wherein the PAM utilization of the resulting lead-acid battery is not significantly impacted by the additive for improving flowability.

FIGURES

FIG. 1 presents micrographs of various graphite additives.

FIG. 2 presents XRD patterns of various graphite additives.

Figure 5:
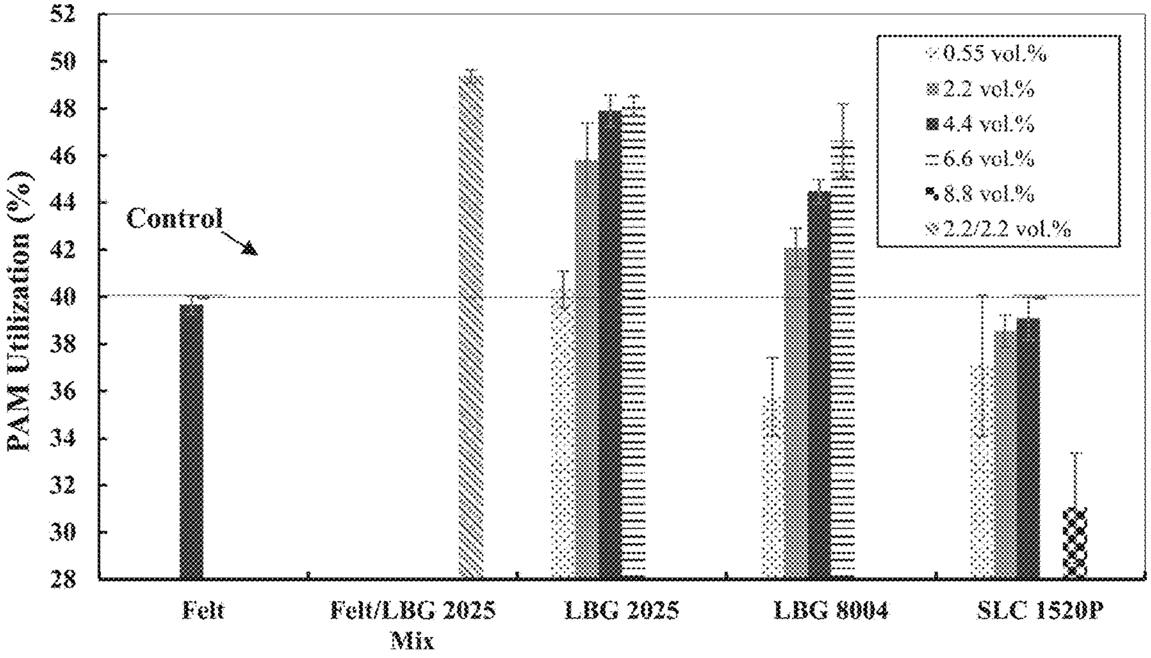

FIG. 5 presents the PAM utilization measurements for various graphite additives.

Figure 6:
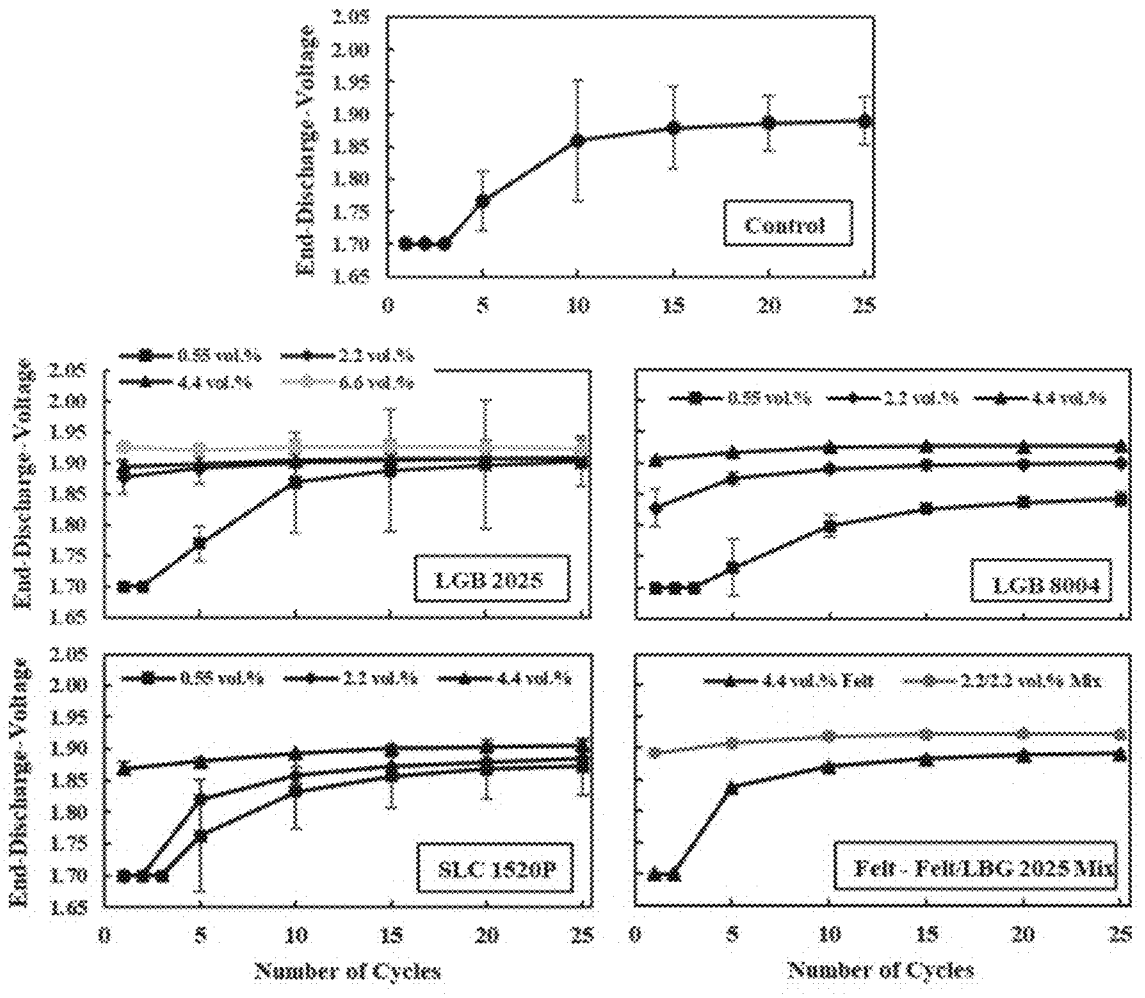
Figure 7A:
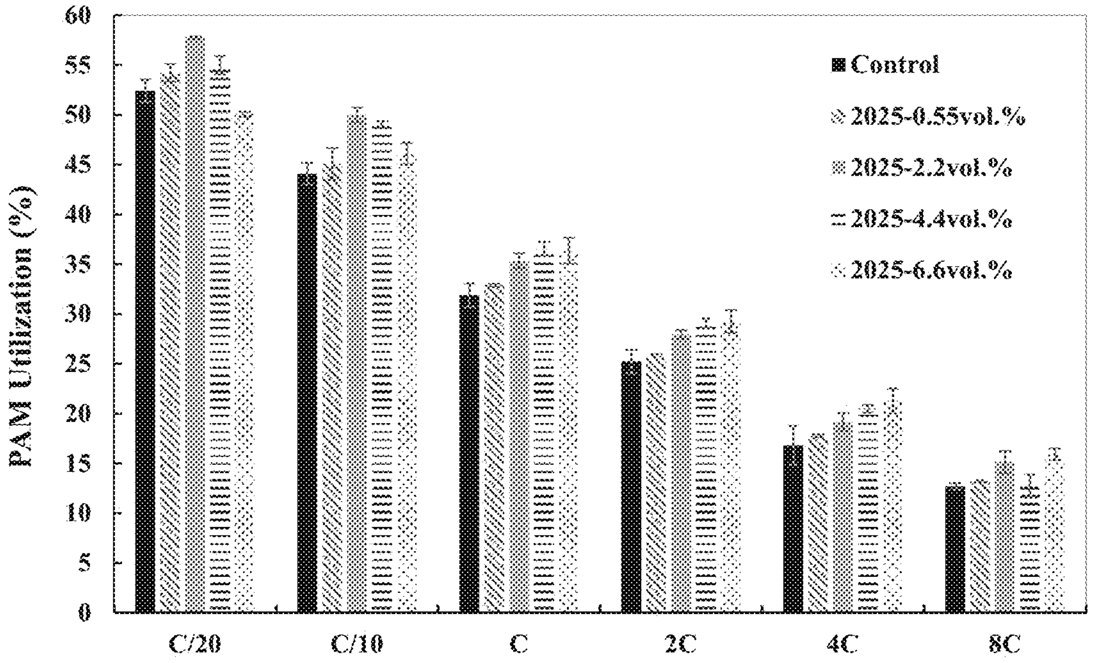
Figure 7B:
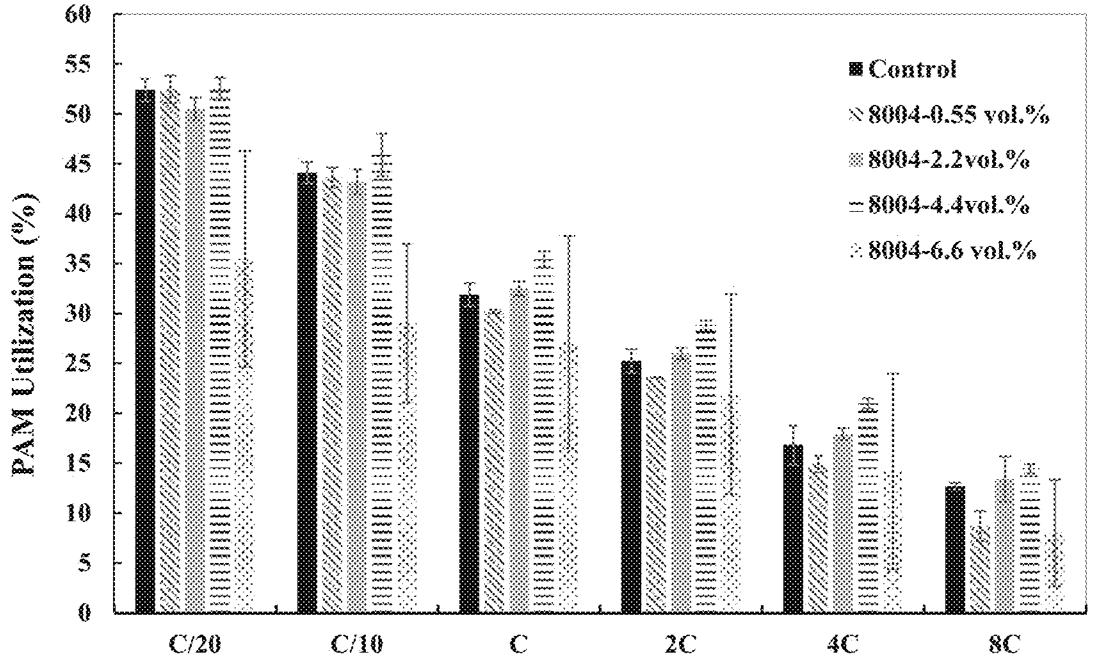
Figure 7C:
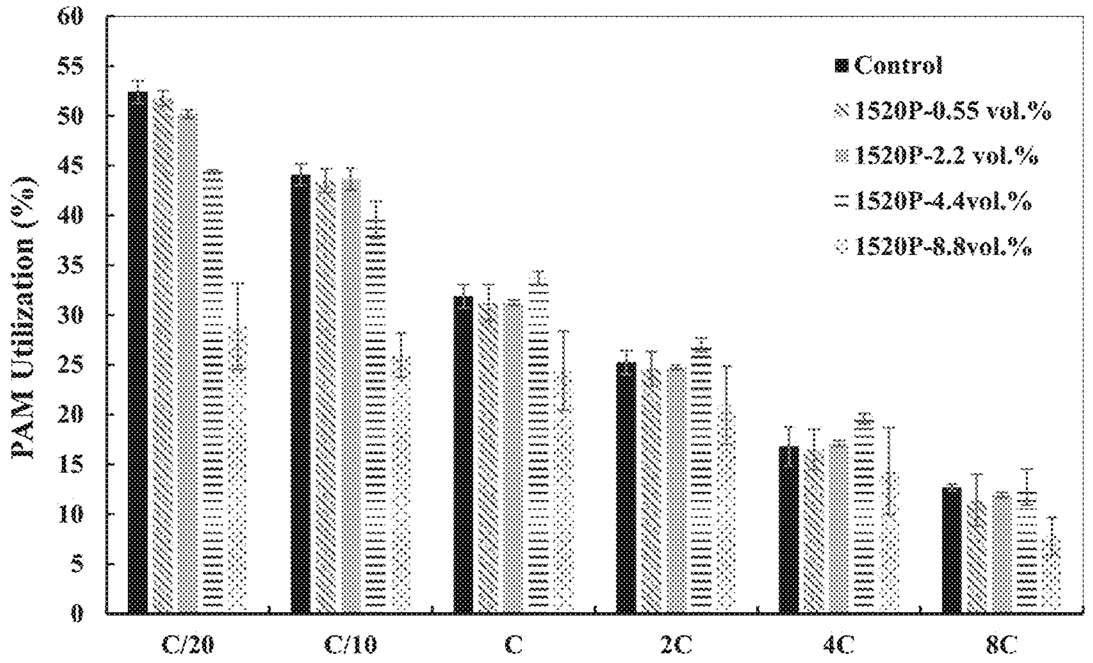
Figure 7D:
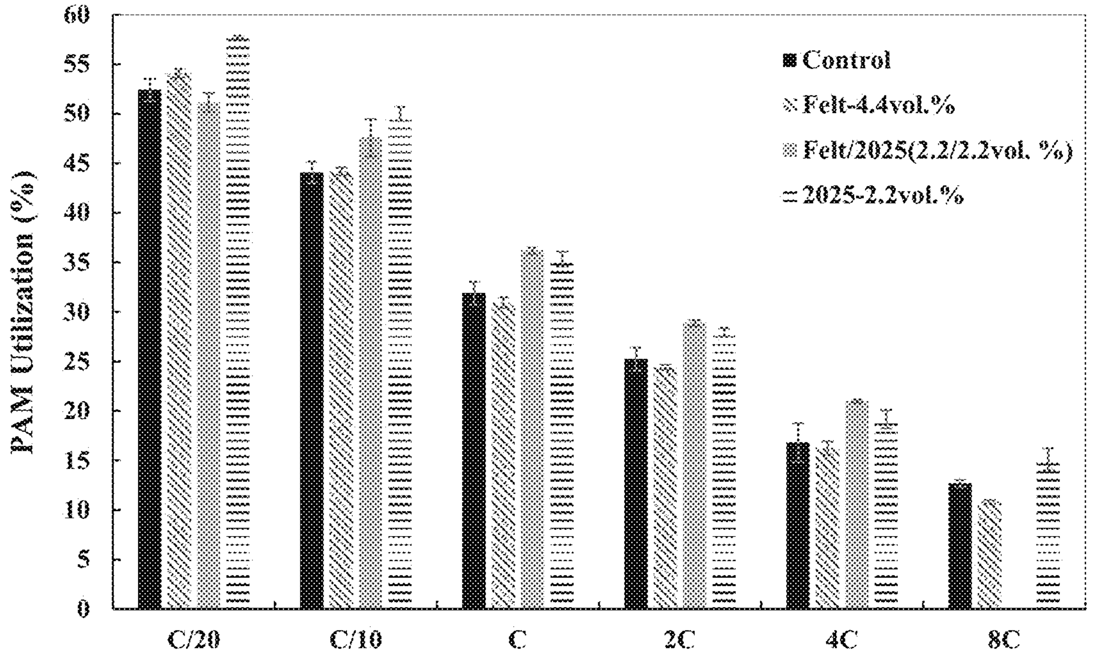

FIG. 6 presents the end-of-discharge voltage at the C-rate as a function of number of conditioning cycles compared for various graphite additives.

FIG. 7*a*-7*d* presents the PAM utilization effects of various graphite additives.

Figure 8:
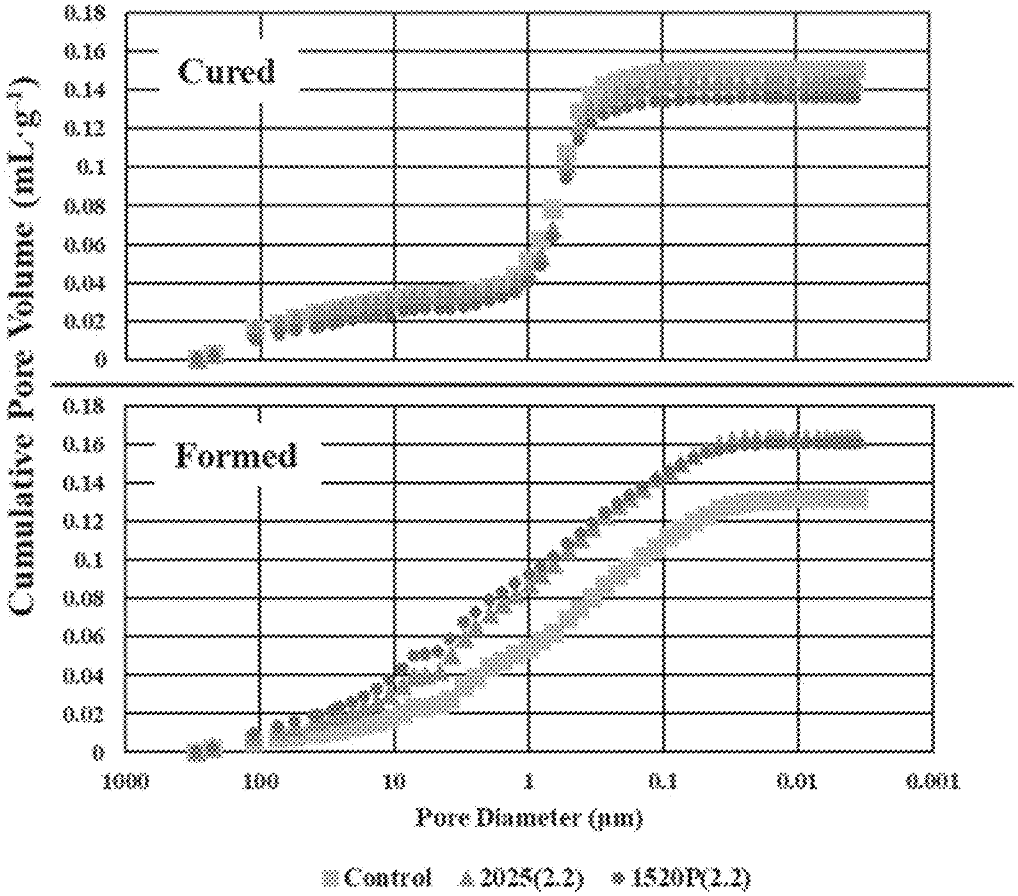

FIG. 8 presents the cumulative pore volume and pore diameter for various graphite additives.

Figure 9:
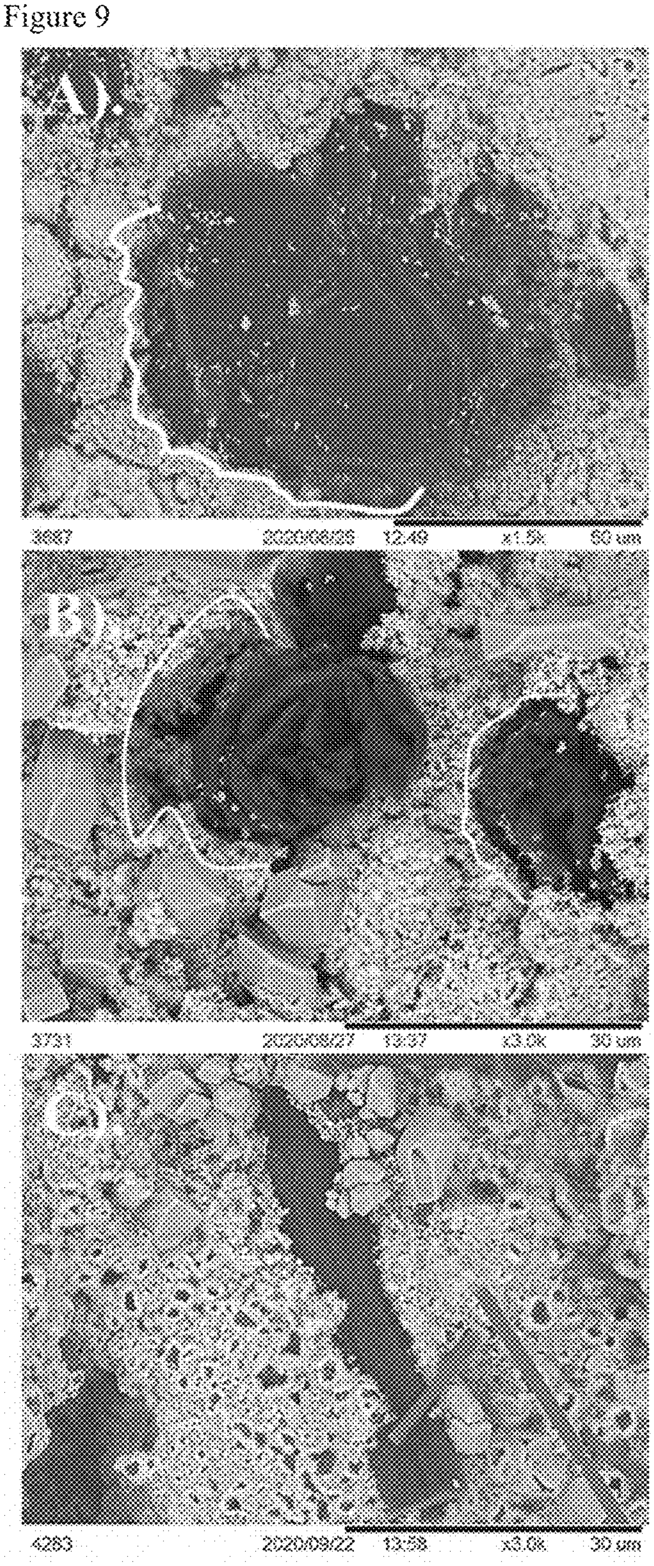

FIG. 9 shows the porosity enhancement of various graphite additives.

Figure 10:
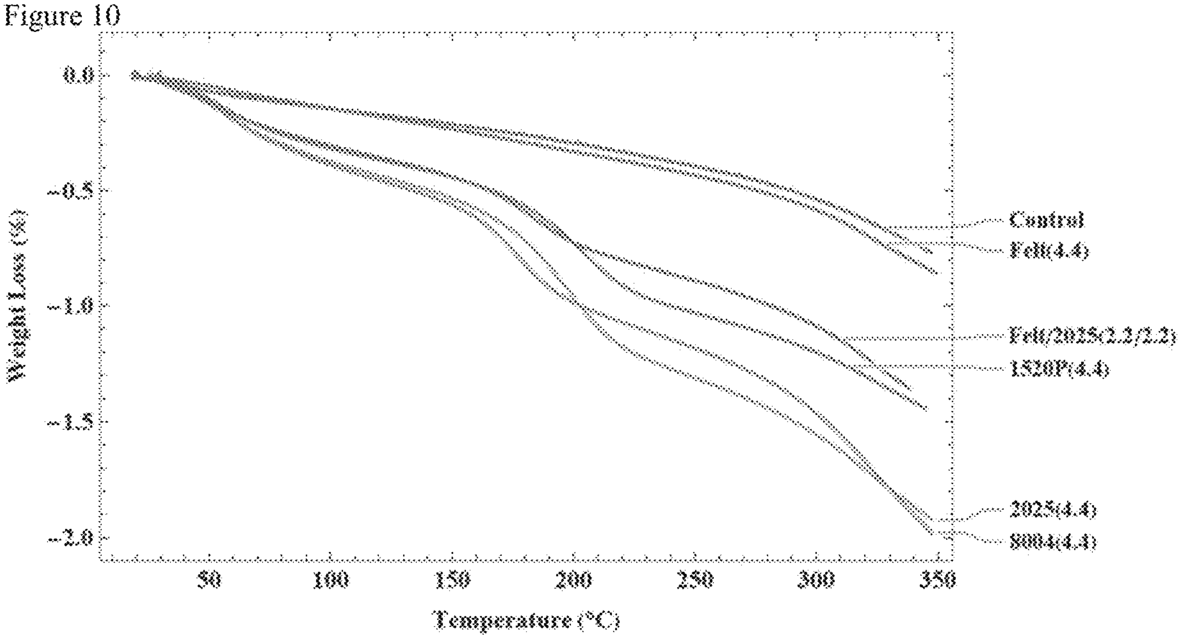

FIG. 10 shows the weight loss as a function of temperature for PAMs comprising various graphite additives.

Figure 11:
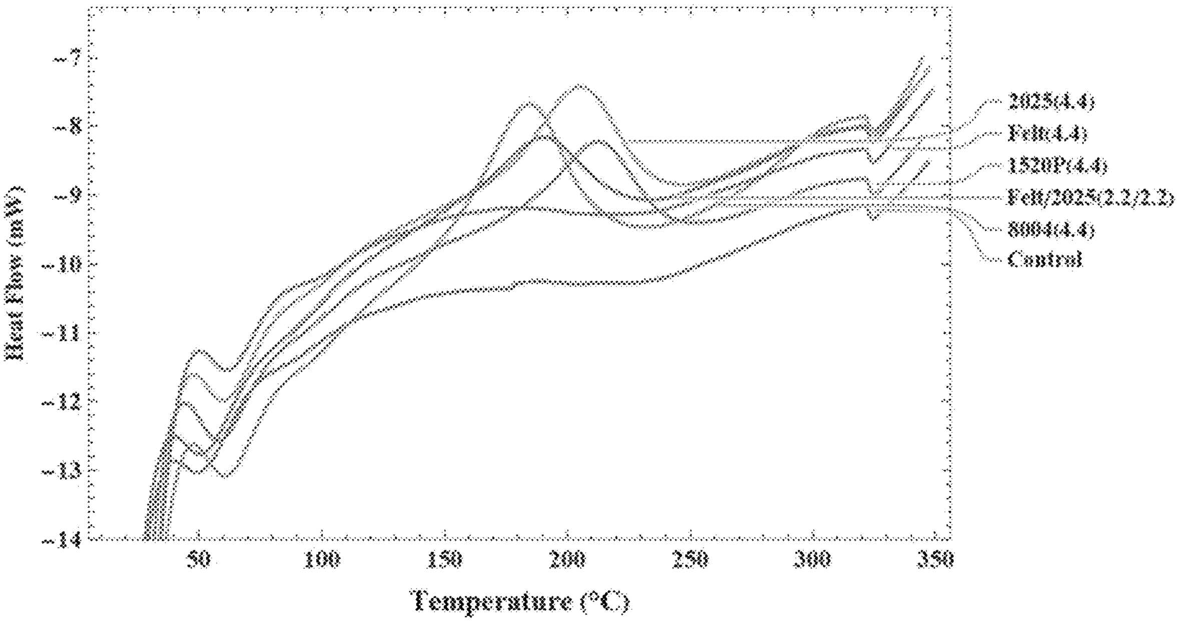

FIG. 11 presents the DSC curves of PAMs comprising various graphite additives.

Figure 12:
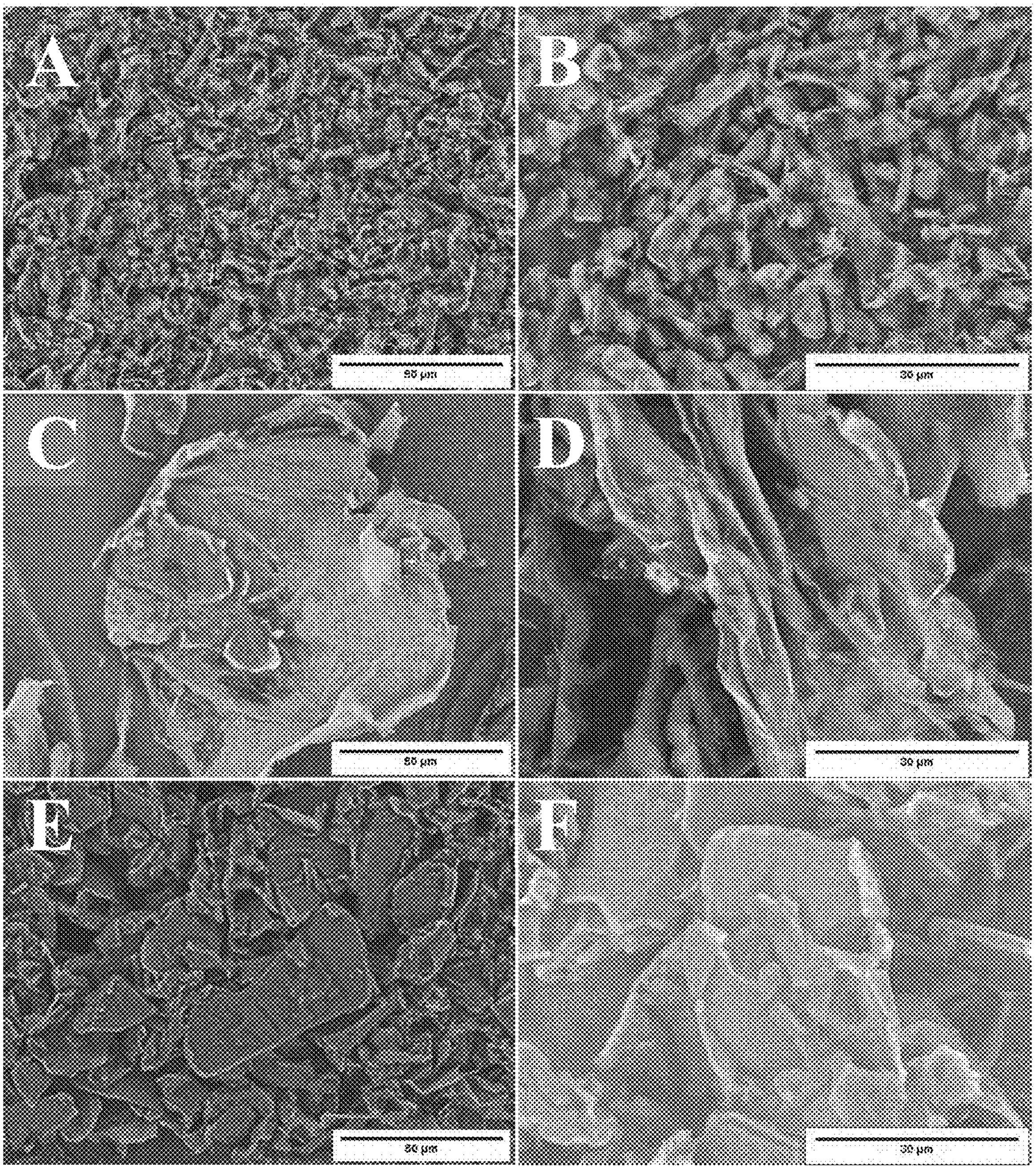

FIG. 12 presents SEM (scanning electron microscope) images of various graphite additives.

Figure 13:
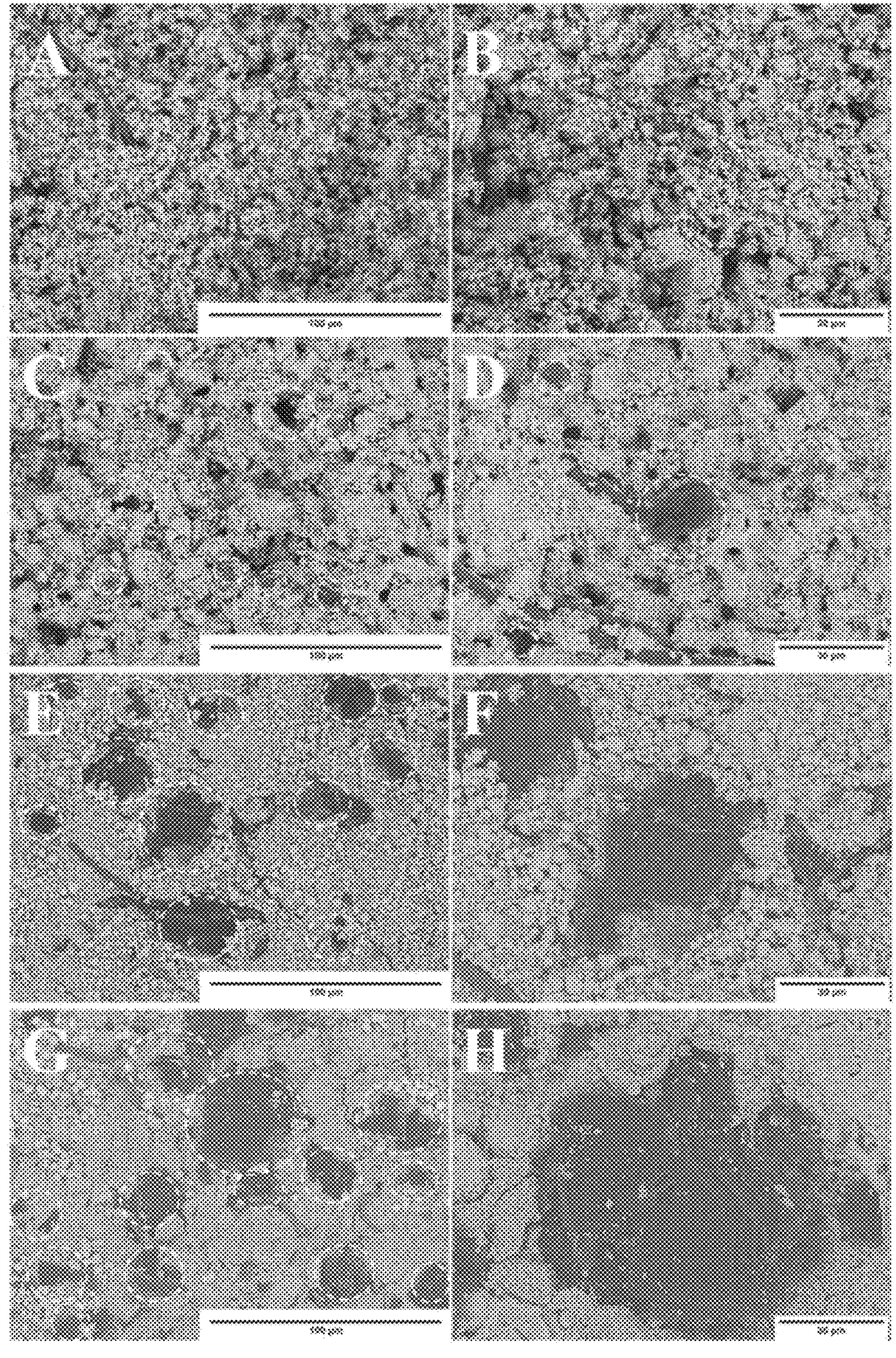

FIG. 13 shows the effect of graphite additives on the microstructural development of the PAM after battery cell formation.

Figure 14:
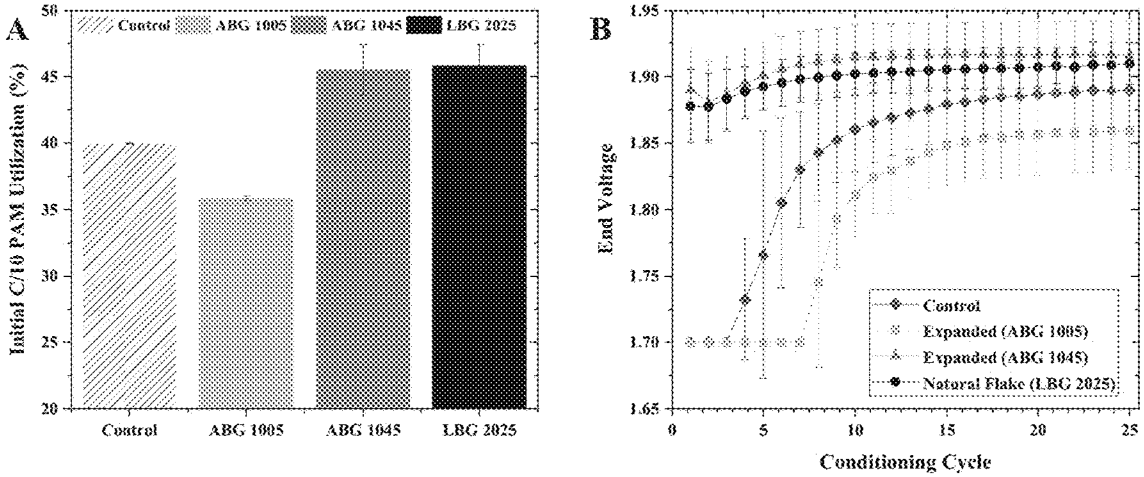

FIG. 14 shows the initial C/10 PAM utilization and end-voltages for twenty-five C-rate conditioning cycles for batteries with and without graphite additives.

Figure 15:
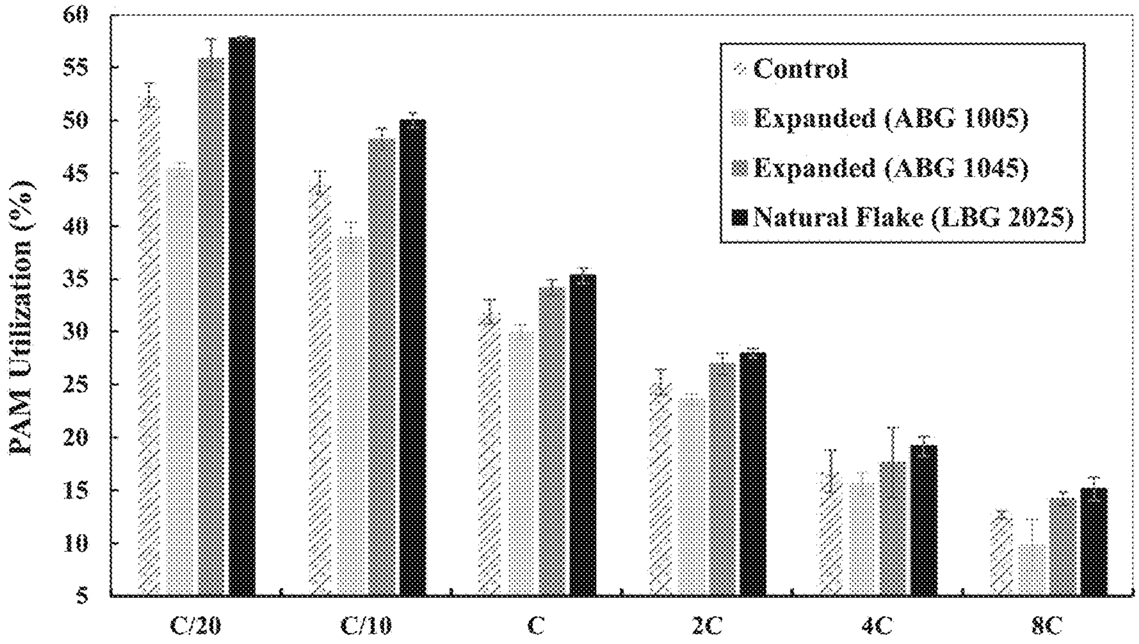

FIG. 15 shows the PAM utilization performance of various graphite additives.

Figure 16:
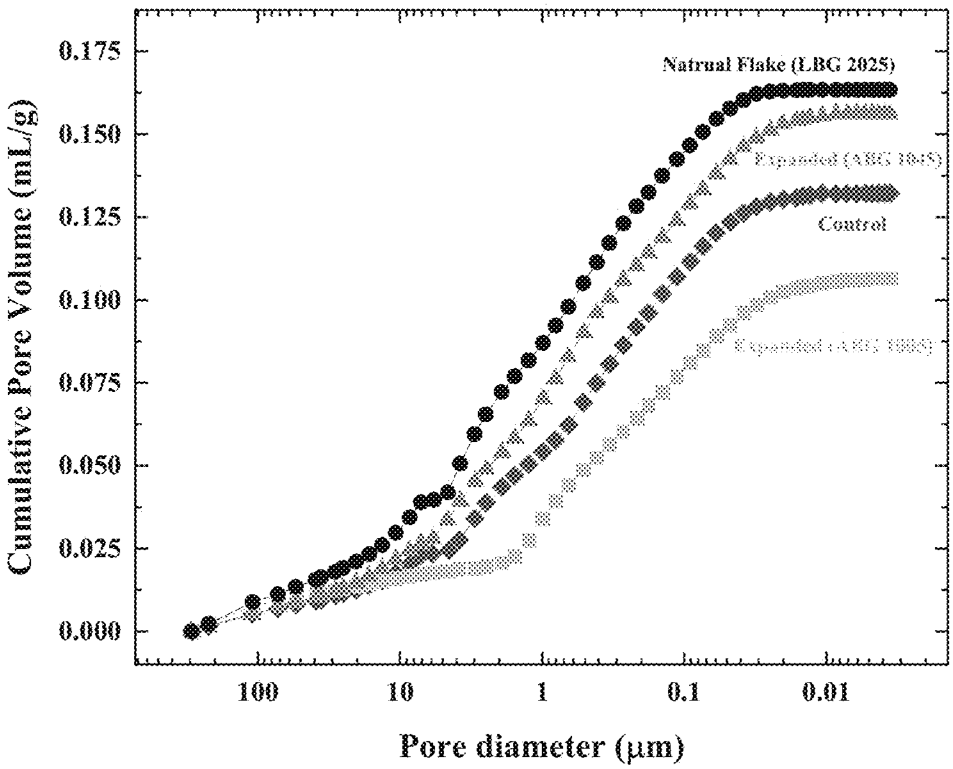

FIG. 16 shows porosity results of various graphite additives.

Figure 17:
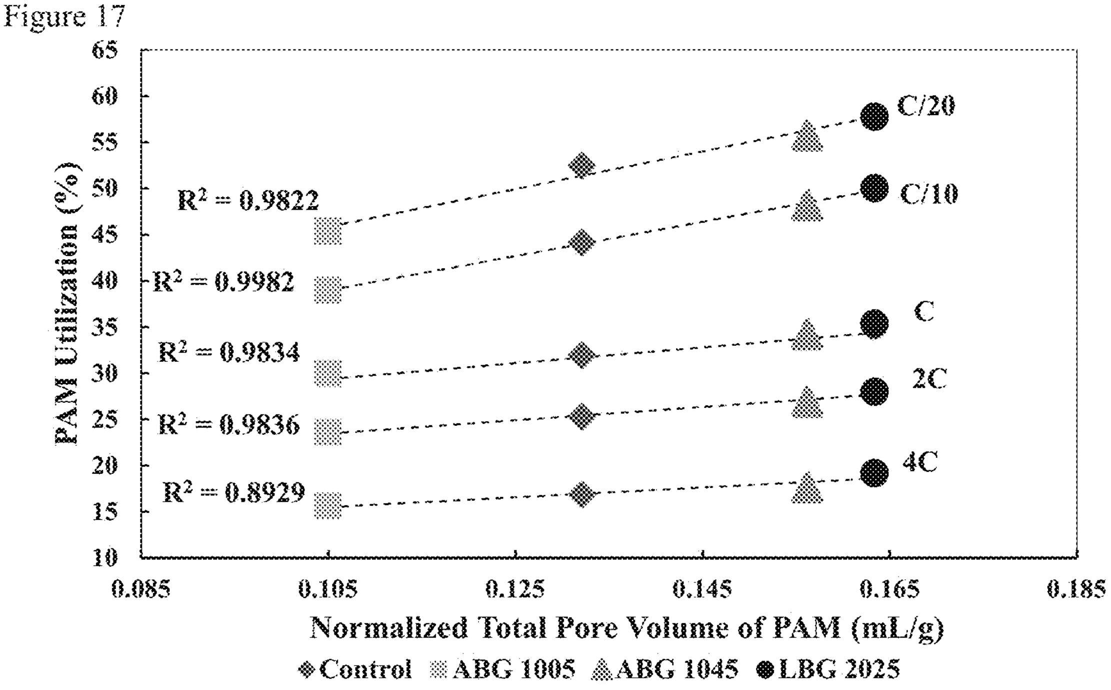

FIG. 17 shows the PAM utilization to total pore volume of PAMs comprising various graphite additives.

Figure 18:
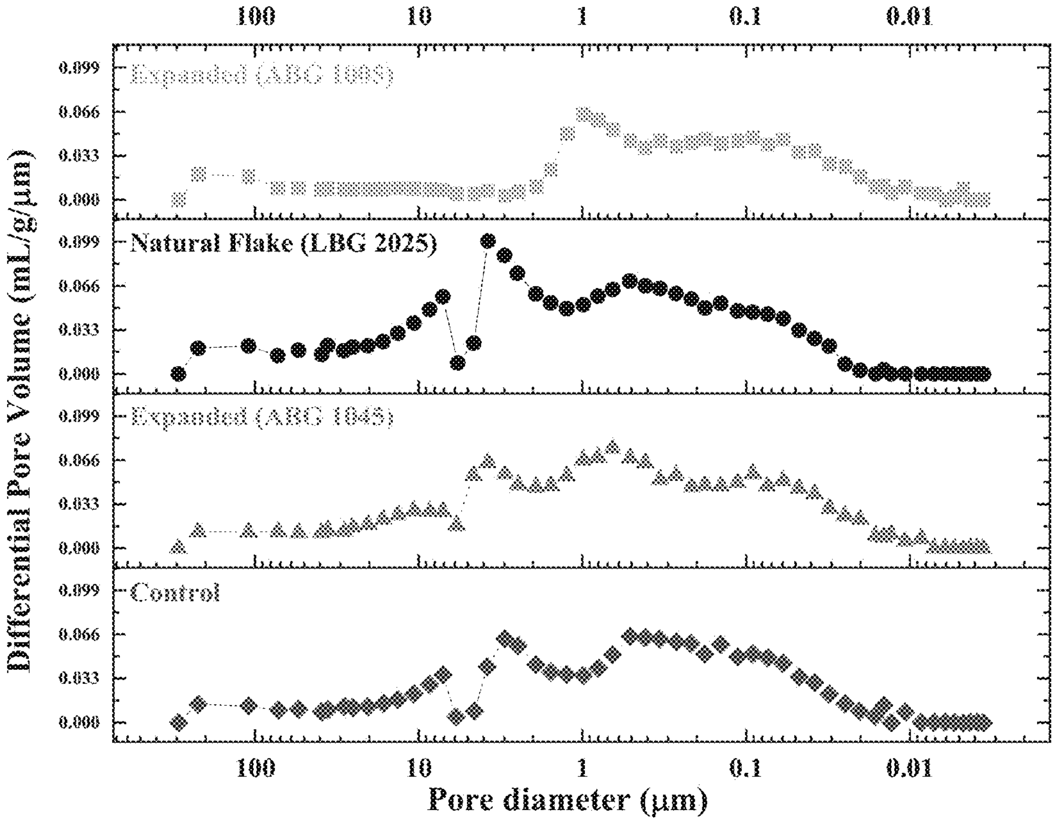

FIG. 18 shows a comparison of pore distribution of PAMs comprising various graphite additives.

Figure 19:
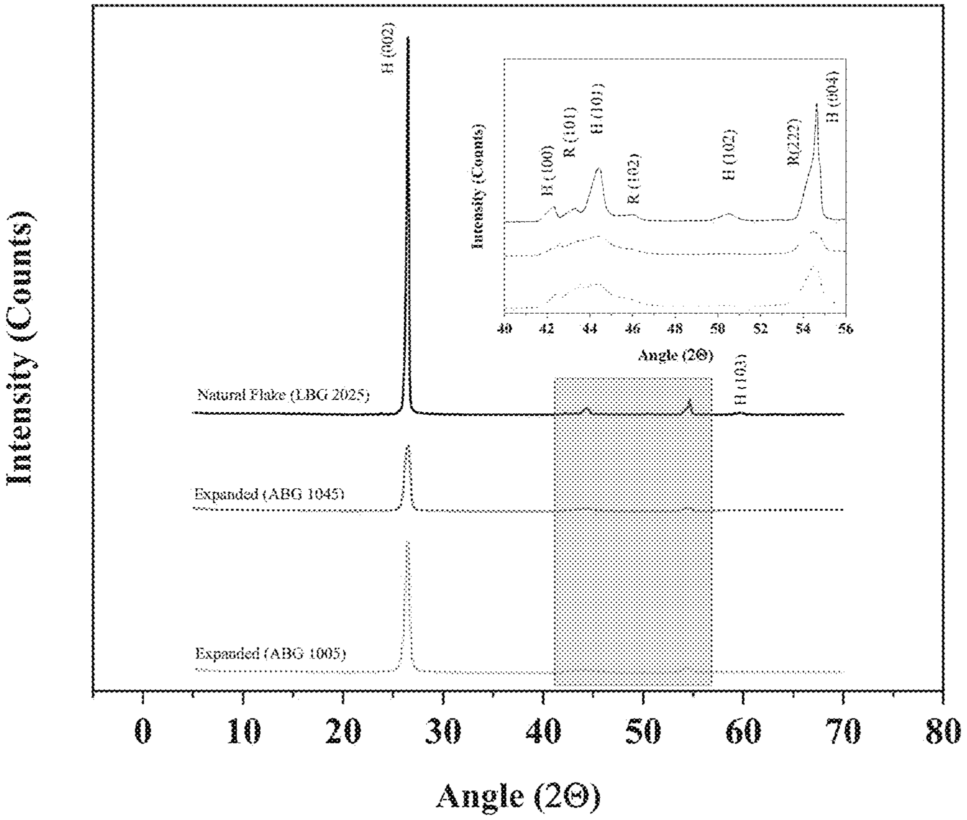

FIG. 19 shows the Raman spectroscopy results for various graphite additives.

Figure 20:
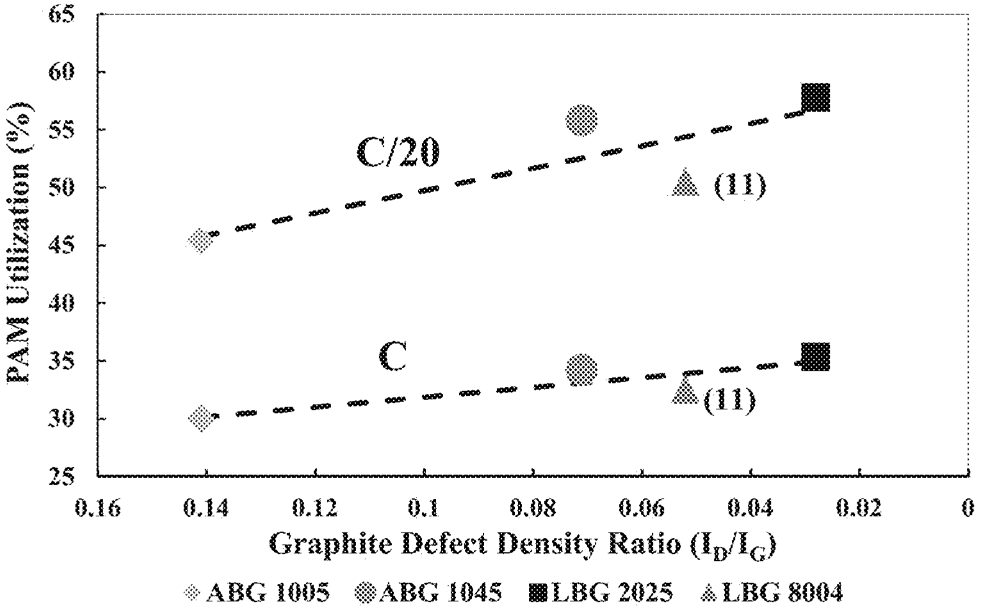

FIG. 20 reports the graphite defect ratio of various graphite additives.

Figure 21:
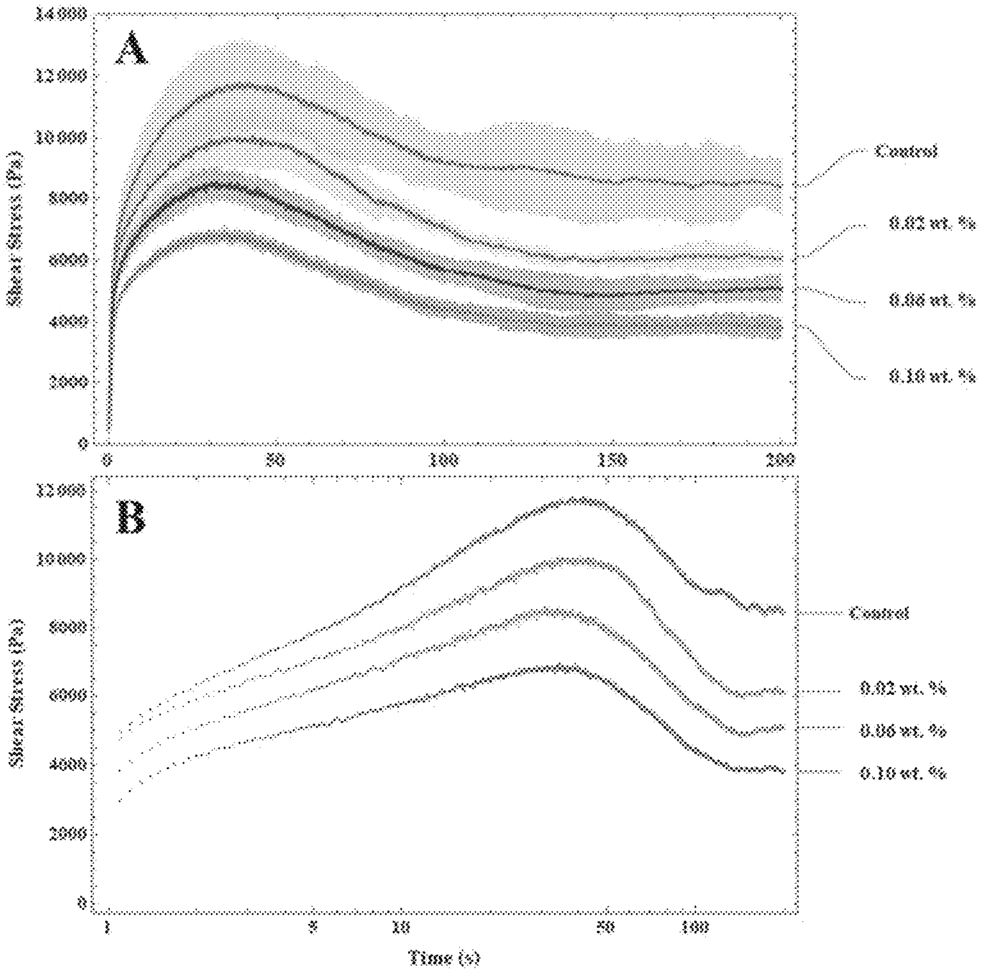

FIG. 21 reports the results of a stress growth test of a battery paste composition comprising DARVAN-7N.

Figure 22:
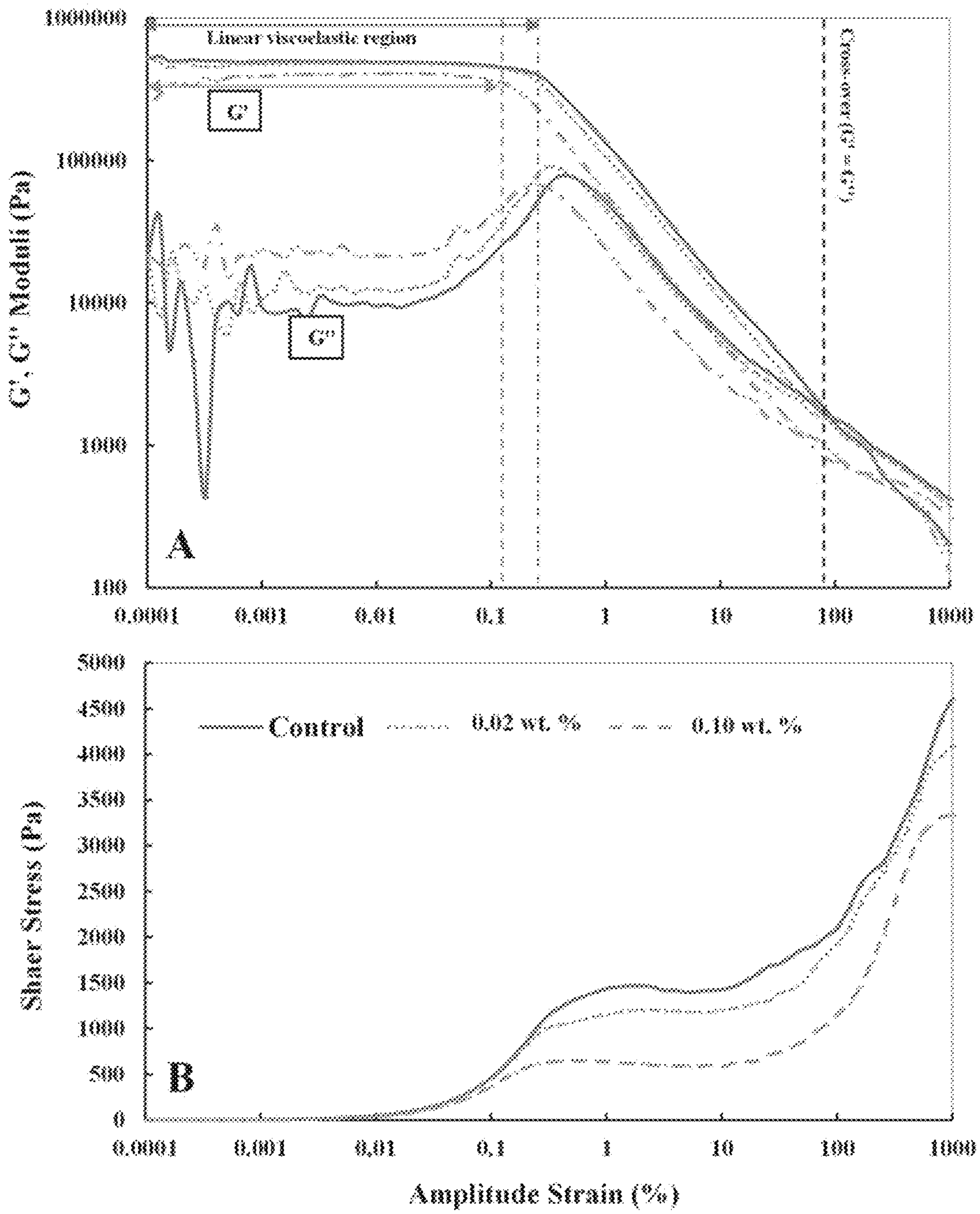

FIG. 22 reports the results of an oscillatory strain amplitude sweep of a battery paste composition comprising DARVAN-7N.

Figure 23:
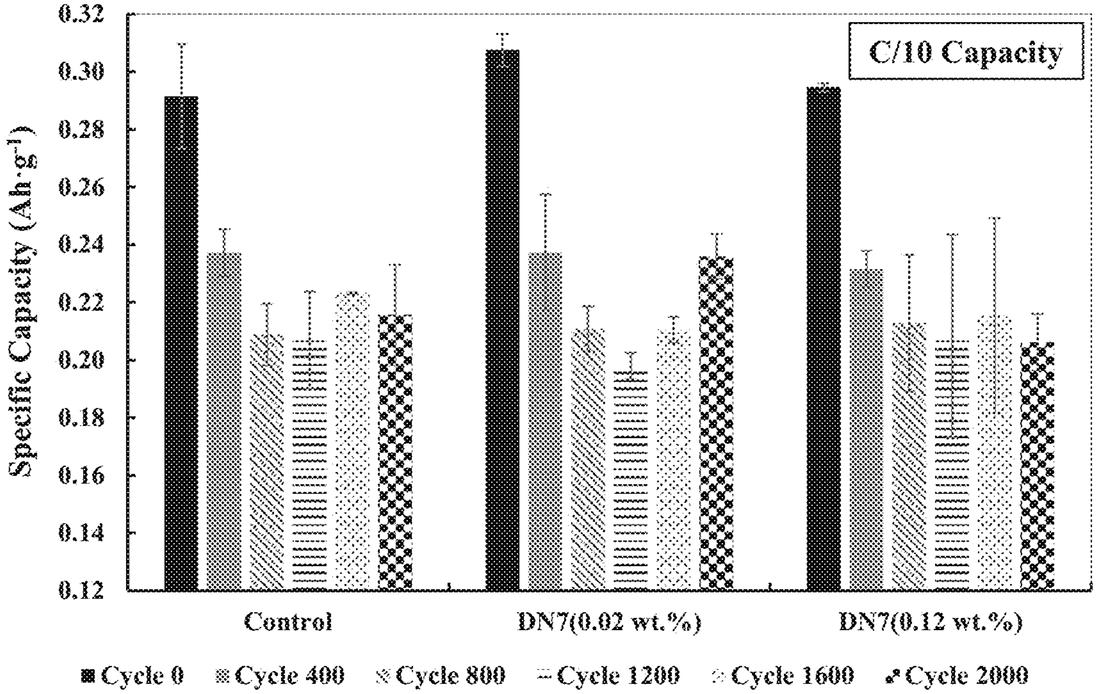

FIG. 23 reports the results of a capacity performance test of battery prepared comprising a battery paste composition comprising DARVAN-7N for C capacity.

Figure 24:
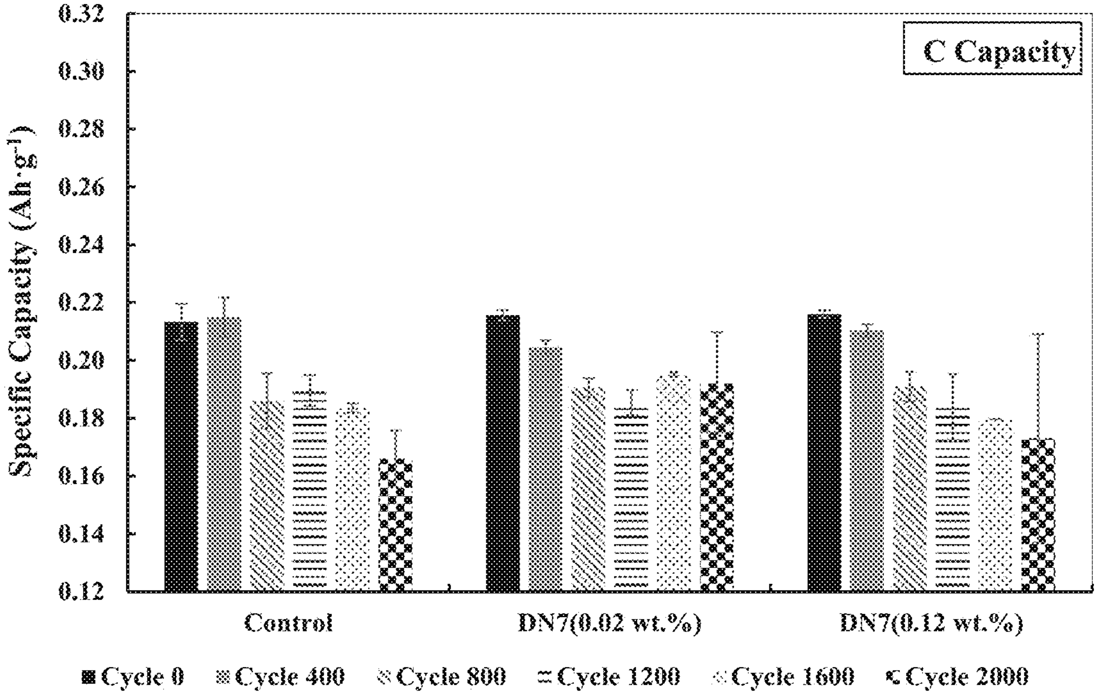

FIG. 24 reports the results of a capacity performance test of battery prepared comprising a battery paste composition comprising DARVAN-7N for C/10 capacity.

Figure 25:
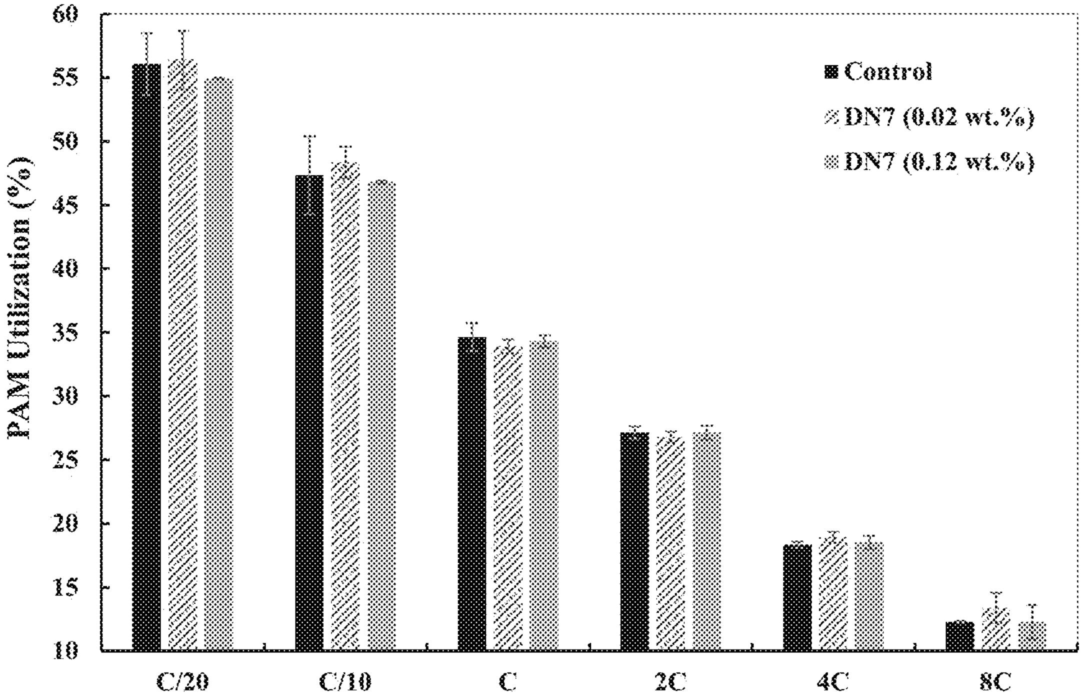

FIG. 25 reports the PAM utilization results of a battery prepared comprising a battery paste composition comprising DARVAN-7N.

DETAILED DESCRIPTION

Lead-acid batteries are typically comprised of one or more positive and negative plates immersed in a sulfuric acid solution.

The battery plates are typically made by a casting methods wherein molten lead is poured into the patterns of the battery grids and cooled, stamping methods wherein the battery grids are based on stamping of lead sheets, or pasting/curing methods wherein pastes are used to fill the battery grids of each plate and are cured under suitable temperature and humidity conditions. In certain embodiments, the positive plate comprises $PbO_2$ and the negative plate comprises a dissimilar form of lead (e.g., pure lead).

To assemble a battery, one or more positive and negative plates are placed inside a container, with non-conductive separators between each plate. All negative plates are connected to negative electrode and all positive plates are connected to a positive electrode. The container is then filled with a suitable electrolyte (e.g., acid).

The $PbO_2$ on the positive battery plates are traditionally considered to be the positive active material (PAM) of the lead-acid battery.

The term positive active material (PAM), when used in the context of the present invention, is understood to represent the active material (e.g., lead) present on the surface of the positive battery plate after application of the battery paste.

A lead-acid battery typically undergoes the following changes during the charging and discharging processes.

| Positive Plate | Electro-lyte | Negative Plate | Dis-charging | Positive Plate | Electro-lyte | Negative Plate |
|---|---|---|---|---|---|---|

$$PbO_2 + 2H_2SO_4 + Pb \rightleftharpoons PbSO_4 + 2H_2O + PbSO_4$$

It is believed that several aspects have traditionally contributed to poor positive active material utilization in lead-acid batteries. Typically, there is an insufficient supply of ions into the interior of the battery plate. This causes the reaction currents to be limited by the overall electrolyte (i.e. acid) diffusion. Progressive $PbSO_4$ build-up typically occurs during use of the battery and may lower the effective conductivity of the material. That is, the amount of surface coverage of $PbSO_4$ can starve the plate from being contacted with the electrolyte (i.e. acid) solution and may isolate the reaction interface from remaining undischarged parts of the $PbO_2$ on the positive plate. Additionally, a combination of activation, ohmic, and concentration polarization processes are responsible for incomplete utilization of the active mass in the lead-acid battery. These polarization processes effectively lower the cell voltage during a constant current discharge until reaching a set end-voltage limit. Typically, the electron conductivity limits the low rates discharge, while the high rates are limited by acid supply.

Additives for the battery paste composition used to form the PAM of the positive battery plates are an attractive approach to solve utilization deficiencies of lead-acid batteries, by enhancing a combination of porous and conductive properties of the PAM structure. Viable additives have one or more of the following properties: chemical inertness in sulfuric acid, electrochemical stability within the positive plate's potential range, proper adhesion within the paste, high oxygen overpotential, and resistivity within the order of $PbO_2$ (i.e. $2.5\times10^{-3}$ Ω·cm).

It has been discovered in the present invention that graphitic carbon as a battery paste composition additive mitigates the limiting mechanisms of PAM utilization. Natural anisotropic graphite, added to the positive plate of a flooded and sealed lead-acid battery, has been surprisingly discovered to actively facilitate acid transport due to the insertion of bisulfate ions between the graphite layers and pore volume expansion of the PAM. It has been discovered that graphite enhances PAM utilization and often increases the cycle life of the battery.

Without being bound by the theory, it was theorized that more acid could infiltrate the cell plate before discharge as well as be resupplied during the reaction in a high pore volume plate because the transport distance is shortened. It was further believed that the ease of sulfuric acid penetration and intercalation between graphene layers would be significantly increased for higher ordered crystalline graphite.

It is thought, without being bound by the theory, that graphite extends the surface conductivity of the current collector and provides conductive links within the active mass. The formations present when graphite additives are used is thought to lead to more conductive zones within the plate, providing larger area for the battery processes to proceed.

It has been discovered that the expansion of the PAM pore volume caused by graphite, although helpful at high discharge rates, can result in adverse effects at lower discharge rates. The expansion of graphite may push connecting particles apart, thus impairing mechanical integrity and lowering electronic conductivity of the PAM structure. Therefore, a balance must be struck between expansion of graphite and its adverse effects. It was theorized that the transport distance is shortened in a higher pore volume plate, as more acid can infiltrate the plate before discharge as well as be resupplied during the reaction.

Experimental results relating to this discovered benefit are discussed below.

In one embodiment, the battery paste compositions of the present invention comprise an active material such as lead (e.g., lead oxide powder) suitable for use in a battery and certain graphite additives. The graphite additive of the present invention may be selected from the group consisting of globular natural graphite, natural flake graphite, expanded flake graphite, and combinations thereof. For example, in certain embodiments, the graphite additive is selected from the group consisting of LBG 2025, LBG 8004, ABG 1045, SLC 1520P, and combinations thereof. In certain embodiments, the natural flake graphite and/or expanded flake graphite is thermally purified in an inert atmosphere to achieve 99.9% carbon.

In one embodiment, the graphite additive is high purity (>99.9%) globular natural graphite SLC 1520P (commercially available from Superior Graphite, Chicago, Ill.). SLC 1520P has a specific surface area of approximately 0.9 $m^2/g$ and average particle size of approximately 25 μm. All specific surface areas for the graphite additives referenced herein are determined using the Brunauer-Emmett-Teller (BET) method.

In certain embodiments, the graphite additive is a natural flake graphite that is an anisotropic graphite selected from the group consisting of LBG 2025, LBG 8004, and combinations thereof (commercially available from Superior Graphite, Chicago, Ill.). LBG 2025 has a specific surface area of approximately 4.02 $m^2/g$ and a median particle size of approximately 13.57 μm. LBG 8004 has a specific surface area of approximately 11.601 $m^2/g$ and an average particle size of approximately 7.56 μm.

In one embodiment, the expanded flake graphite is ABG-1045 (commercially available from Superior Graphite, Chicago, Ill.). ABG-1045 has a specific surface area of approximately 18.49 $m^2/g$ and an average particle size of 45 μm.

Expanded flake graphite is typically prepared by a process comprising purifying a natural flake graphite in an inert atmosphere to achieve a 99.9% carbon flake graphite material; oxidizing and intercalating the flake graphite material in a sulfuric acid solution to prepare a flake graphite intermediate; and drying and air milling the flake graphite intermediate to produce the expanded flake graphite. For example, the expanded graphite generally is subjected to heat exposure up to 800° C. that evaporates the anions and breaks the crystals to form thin sheets of 100 nm or less. In another embodiment, the expanded graphite forms sheets of graphite having a thickness of 250 nm or less, 225 nm or less, 200 nm or less, 175 nm or less, 150 nm or less, 125 nm or less, 100 nm or less, 75 nm or less, 50 nm or less, 25 nm or less, 15 nm or less, 10 nm or less, or 5 nm or less.

When comparing expanded and natural flake graphite, expanded flake graphite typically has a tissue-like appearance. The graphene layer of an expanded flake graphite may be visibly more wrinkled, folded, twisted, and detached from each other, especially around the edges. Expanded graphite powders are characterized by a very high bulk volume, high electrical conductivity, and extremely low thickness of particles. Conversely, natural flake graphite typically appears thicker and more compact. The basal surfaces of the particles of natural flake graphite generally appeared smoother with less visible defects. The morphological differences of expanded and natural flake graphite can be traced back to the synthesis of the graphite.

In various embodiments, the graphite additive comprises a median particle size of about 5 μm or greater, of about 6 μm or greater, about 7 μm or greater, about 8 μm or greater, about 9 μm or greater, about 10 μm or greater, about 11 μm or greater, about 12 μm or greater, about 13 μm or greater, about 14 μm or greater, about 15 μm or greater, about 20 μm or greater, about 25 μm or greater, or about 30 μm or greater. In another embodiment, the graphite additive comprises a median particle size of from about 5 μm to about 50 μm, from about 5 μm to about 45 μm, from about 5 μm to about 40 μm, from about 5 μm to about 35 μm, from about 5 μm to about 30 μm, from about 10 μm to about 30 μm, from about 15 μm to about 30 μm, or from about 20 μm to about 30 μm.

In other embodiments, the graphite additive comprises particles having an average particle size of about 10 μm or greater, about 15 μm or greater, about 20 μm or greater, about 25 μm or greater, about 30 μm or greater, about 35 μm or greater, about 40 μm or greater, about 45 μm or greater, about 50 μm or greater, or about 55 μm or greater. In further embodiments, the graphite additive comprises particles having an average particle size of from about 10 μm to about 55 μm, from about 15 μm to about 55 μm, from about 20 μm to about 55 μm, from about 25 μm to about 55 μm, from about 30 μm to about 55 μm, from about 35 μm to about 55 μm, from about 35 μm to about 50 μm, or from about 40 μm to about 50 μm.

In certain embodiments, the graphite additive exhibits a specific surface area of from about 0.5 to about 20 $m^2/g$, from about 1 to about 20 $m^2/g$, from about 2 to about 20 $m^2/g$, from about 3 to about 20 $m^2/g$, from about 4 to about 20 $m^2/g$, from about 5 to about 20 $m^2/g$, from about 6 to about 20 $m^2/g$, from about 7 to about 20 $m^2/g$, from about 8 to about 20 $m^2/g$, from about 9 to about 20 $m^2/g$, from about 10 to about 20 $m^2/g$, from about 11 to about 20 $m^2/g$, from about 12 to about 20 $m^2/g$, from about 13 to about 20 $m^2/g$, from about 14 to about 20 $m^2/g$, from about 15 to about 20 $m^2/g$, from about 15 to about 19 $m^2/g$, from about 16 to about 19 $m^2/g$, from about 17 to about 19 $m^2/g$, or from about 18 to about 19 $m^2/g$.

In some embodiments, the graphite additive comprises a degree of graphitic order (calculated by the ratio of amorphous to graphitic domain peak intensities $$\frac{I_D}{I_G}$$

determined from Ramana spectra) of less than about 0.14, less than about 0.13, less than about 0.12, less than about 0.11, less than about 0.10, less than about 0.09, less than about 0.08, less than about 0.07, less than about 0.06, less than about 0.05, less than about 0.04, less than about 0.03, less than about 0.02, or less than about 0.01.

In embodiments wherein the graphite additive comprises a natural flake graphite or expanded flake graphite, the battery paste composition may comprise the graphite additive in a concentration of less than about 7.0 vol. %, less than about 6.5 vol. %, less than about 6.0 vol. %, less than about 5.5 vol. %, less than about 5.0 vol. %, less than about 4.5 vol. %, less than about 4.4 vol. %, less than about 4.3 vol. %, less than about 4.2 vol. %, less than about 4.1 vol. %, less than about 4.0 vol. %, less than about 3.5 vol. %, less than about 3.0 vol. %, less than about 2.5 vol. %, less than about 2 vol. %, less than about 1.5 vol. %, less than about 1.0 vol. %, or less than about 0.5 vol. %.

In embodiments wherein the graphite additive comprises a globular natural graphite, the battery paste composition may comprise the graphite additive in a concentration of less than about 4.4 vol. %, less than about 4.3 vol. %, less than about 4.2 vol. %, less than about 4.1 vol. %, less than about 4.0 vol. %, less than about 3.5 vol. %, less than about 3.0 vol. %, less than about 2.5 vol. %, less than about 2 vol. %, less than about 1.5 vol. %, less than about 1.0 vol. %, or less than about 0.5 vol. %.

In one embodiment, the graphite additive comprises LBG 8004 or SLC 1520 and the battery paste comprises the graphite additive in a concentration of less than about 4.4 vol. %, less than about 4.3 vol. %, less than about 4.2 vol. %, less than about 4.1 vol. %, less than about 4.0 vol. %, less than about 3.5 vol. %, less than about 3.0 vol. %, less than about 2.5 vol. %, less than about 2 vol. %, less than about 1.5 vol. %, less than about 1.0 vol. %, or less than about 0.5 vol. %.

Due to its rheological properties, battery paste compositions comprising an active material such as lead (e.g., lead oxide powder) may be difficult to spread accurately and efficiently on a battery plate (e.g., on lead current collectors), particularly in industrial or large scale settings. Industrial scale application of a battery paste composition to a battery plate typically involve mixing the paste in a large reactor that controls the rate of addition of the components (e.g., the acid), temperature, and mixing speed. After preparation, the paste is released progressively into a hopper that transfers the battery paste composition to a high-speed belt-type pasting machine. The pasting machine spreads or presses the battery paste composition onto the battery plate. For example, in one embodiment, the pasting machine spreads or presses the battery paste composition onto the top of perforated lead grid sheets, wherein glass threads or cellulose pasting paper are placed under the grids to physically support the applied paste from the bottom. A system of conveyor belts may then be used to transports the pasted grid and paper to pressing and cutting unit operations for preparing the final battery plates having the battery paste composition adhered thereto.

It has been determined that dispersants such as sodium polymethacrylate dispersants may contribute to improving the properties desirable for preparing the composition and adhering the composition to a battery plate. For example, sodium polymethacrylate dispersants have been found to have a positive impact on the texture and flowability of the battery paste composition without having a negative impact on the paste density and/or battery performance. Therefore, in some embodiments, the battery paste compositions of the present invention comprise a sodium polymethacrylate dispersant.

In certain embodiment, sodium polymethacrylate dispersants lower the yield stress/sheer stress necessary for the battery past composition to begin to flow, as compared to a battery paste composition not comprising the dispersant. In certain other embodiments, battery paste compositions prepared using a sodium polymethacrylate dispersant result in the merging of cracks on the surface of the paste and result in the connection of detached pieces of paste in order to form one smooth body, which results in better flowability.

It has been further discovered that increasing the amount of sodium polymethacrylate dispersant present in the battery paste composition may lower the yield stress/sheer stress necessary for the battery composition to begin to flow.

In certain embodiments, the battery paste compositions of the present invention comprise about 0.01 wt. % or greater, about 0.02 wt. % or greater, about 0.04 wt. % or greater, about 0.06 wt. % or greater, about 0.08 wt. % or greater, about 0.10 wt. % or greater, about 0.12 wt. % or greater, about 0.14 wt. % or greater, about 0.16 wt. % or greater, about 0.18 wt. % or greater, about 0.20 wt. % or greater, about 0.30 wt. % or greater, about 0.40 wt. % or greater, about 0.50 wt. % or greater, about 0.60 wt. % or greater, about 0.70 wt. % or greater, about 0.80 wt. % or greater, about 0.90 wt. % or greater, or about 1.00 wt. % or greater of a sodium polymethacrylate dispersant based on the total leady oxide concentration of the battery paste composition. For example, from about 0.01 wt. % to about 1.00 wt. %, from about 0.01 wt. % to about 0.90 wt. %, from about 0.01 wt. % to about 0.80 wt. %, from about 0.01 wt. % to about 0.70 wt. %, from about 0.01 wt. % to about 0.60 wt. %, from about 0.01 wt. % to about 0.50 wt. %, from about 0.01 wt. % to about 0.40 wt. %, from about 0.01 wt. % to about 0.30 wt. %, from about 0.01 wt. % to about 0.20 wt. %, from about 0.02 wt. % to about 0.20 wt. %, from about 0.04 wt. % to about 0.20 wt. %, from about 0.06 wt. % to about 0.20 wt. %, from about 0.08 wt. % to about 0.20 wt. %, from about 0.10 wt. % to about 0.20 wt. %, from about 0.10 wt. % to about 0.18 wt. %, from about 0.10 wt. % to about 0.16 wt. %, or from about 0.10 wt. % to about 0.14 wt. % of a sodium polymethacrylate dispersant based on the total leady oxide concentration of the battery paste composition.

In certain embodiments wherein the battery paste compositions of the present invention comprise a sodium polymethacrylate dispersant, the addition of the dispersant does not have an impact on the discharge utilization of the PAM of the resulting battery plate and battery, the methods of formation of which are described below.

In other embodiments, the battery paste compositions of the present invention comprise a graphite additive and a dispersant. For example, in some embodiments, the battery paste compositions of the present invention comprise a graphite additive selected from the group consisting of globular natural graphite, natural flake graphite, expanded flake graphite, and combinations thereof and a sodium polymethacrylate dispersant. Still further, in certain embodiments, the battery paste compositions of the present invention comprise a graphite additive selected from the group consisting of LBG 2025, LBG 8004, ABG 1045, SLC 1520P, and combinations thereof and the sodium polymethacrylate dispersant DARVAN-7N.

The battery paste compositions of the present invention may further comprise additional materials suitable for forming a battery paste composition. For example, in one embodiment, the composition further comprises acid and/or water. In certain embodiments, the composition further comprises glass microfibers.

In one embodiment, the battery paste composition of the present invention is prepared by combining glass microfibers, water, lead oxide powder (25% Pb), sulfuric acid, and the graphite additive in the form of a powder in a closed container. The sulfuric acid is added slowly to ensure the temperature of the mixture remains below about 60° C. The relative concentrations of each component of an exemplary battery paste composition is set forth below in Table 1, with alternative concentrations of the graphite additive from about 0.73 vol. % to about 5.86 vol. %.

TABLE 1

| Glass micro-fibers (g) | Deion-ized water (g) | Leady oxide (g) | Sulfuric acid (1.40 s.g., g) | Graphite additive (g) | | | | |
|---|---|---|---|---|---|---|---|---|
| 0.50 | 13.8 | 100 | 6.10 | 0.73 | 1.47 | 2.93 | 4.40 | 5.86 |

In certain embodiments, the present invention is directed to a battery prepared utilizing the battery paste composition described above. For example, the battery paste composition may be applied to a positive battery plate onto current collector grids and subjected to a curing (and optional drying) process to adhere the battery paste composition to the plate. Subsequently, the one or more battery plates having the battery paste composition adhered thereto is contacted with an acid in a suitable container to form the battery.

In one embodiment, the battery is prepared by a process comprising applying a battery paste composition (e.g., comprising a graphite additive and/or a sodium polymethacrylate dispersant) to one or more battery plates; curing the applied battery paste composition at a temperature of about 50° C. or greater to adhere the battery paste composition to the one or more battery plates; and contacting the one or more battery plates having the battery paste composition adhered thereto with an acid in a container to form the battery. For example, in one embodiment, a battery plate having dimensions of 19.50 mm×21.70 mm×1.10 mm had a thickness of approximately 2.20 mm after application of the battery paste.

After application of the battery paste composition, the plate(s) are cured, for example, at a temperature of about 35° C. or greater, about 40° C. or greater, about 45° C. or greater, about 50° C. or greater, about 55° C. or greater, about 60° C. or greater, about 65° C. or greater, about 70° C. or greater, about 75° C. or greater, about 80° C. or greater, or about 85° C. or greater. Additionally, the plates may be cured at a relatively humidity of about 50% or greater, about 55% or greater, about 60% or greater, about 65% or greater, about 70% or greater, about 75% or greater, about 80% or greater, about 85% or greater, or about 90% or greater. The curing process may be conducted for a time period of about 1 hour or greater, about 2 hours of greater, about 4 hours of greater, about 6 hours of greater, about 8 hours of greater, about 10 hours of greater, about 12 hours of greater, about 24 hours of greater, about 36 hours of greater, or about 48 hours of greater. In one embodiment, the plate(s) are cured in about 85% relative humidity at about 65° C. for 24 hours.

The cured plate(s) may be dried, for example, at a temperature of about 35° C. or greater, about 40° C. or greater, about 45° C. or greater, about 50° C. or greater, about 55° C. or greater, about 60° C. or greater, about 65° C. or greater, about 70° C. or greater, about 75° C. or greater, about 80° C. or greater, or about 85° C. or greater. Additionally, the plates may be cured at a relatively humidity of about 15% or less, about 10% or less, about 5% or less, about 4% or less, about 3% or less, about 2% or less, or about 1% or less. The drying process may be conducted for a time period of about 1 hour or greater, about 2 hours of greater, about 4 hours of greater, about 6 hours of greater, about 8 hours of greater, about 10 hours of greater, about 12 hours of greater, about 24 hours of greater, about 36 hours of greater, or about 48 hours of greater. In one embodiment, the plate(s) are dried in about 0% humidity at about 65° C. for about 24 hours.

In certain embodiments, the total pore volume of the positive active material (PAM) of the battery plate having a battery paste composition adhered thereto is about 0.14 ml/g or greater, about 0.15 ml/g or greater, about 0.16 ml/g or greater, about 0.17 ml/g or greater, about 0.18 ml/g or greater, about 0.19 ml/g or greater, or about 0.20 ml/g or greater.

In certain embodiments, the discharge utilization of the positive active material (PAM) of a battery formed in accordance with the invention, as defined by the formula $$\frac{\text{Measured Capacity}}{\text{Stochiometric Capacity}} \times 100$$

at the initial C/10 discharge, is about 40% or greater, about 41% or greater, about 42% or greater, about 43% or greater, about 44% or greater, about 45% or greater, about 46% or greater, about 47% or greater, about 48% or greater, about 48% or greater, or about 50% or greater.

In some embodiments, the discharge utilization of the positive active material (PAM) of the battery is about 5%, about 6%, about 7%, about 8%, about 9%, about 10%, about 15%, about 20%, or about 25% greater than the discharge utilization of the positive active material (PAM) of an otherwise identical comparative battery in which the one or more battery plates do not have the battery paste composition comprising a graphite additive adhered thereto.

EXAMPLES

Example 1—Characterization of Graphite Additives

Several graphite additives were tested having the properties set forth in Table 2 below. $I_R/I_H$ represents the ratio of rhombohedral to hexagonal phase amounts from the (101) plane in the XRD patterns. $I_D/I_G$ represents the degree of order of graphitic domains determined from Raman spectra (i.e. the ratio of amorphous to graphitic domain peak intensities).

TABLE 2

| Graphite Additive | Loadings (vol. %) | Shape | Median Size (μm) | BET ($m^2 \cdot g^{-1}$) | $I_R/I_H$ | $I_D/I_G$ | Manufacturer |
|---|---|---|---|---|---|---|---|
| LBG 2025 | 0.55, 2.2, 4.4, 6.6 | Flake | 13.57 | 4.526 | 0.47 | 0.065 | Superior Graphite |
| LBG 8004 | 0.55, 2.2, 4.4, 6.6 | Flake | 7.56 | 11.601 | 1 | 0.21 | Superior Graphite |
| SLC 1520P | 0.55, 2.2, 4.4, 8.8 | Round | 25 | $0.9^{21}$ | 0.36 | 0.28 | Superior Graphite |
| Felt | 2.2, 4.4 | Fiber | 10 (wide) 50-500 (long) | N/A | N/A | 1.94 | AvCarb Material Solutions |

Figure 1:
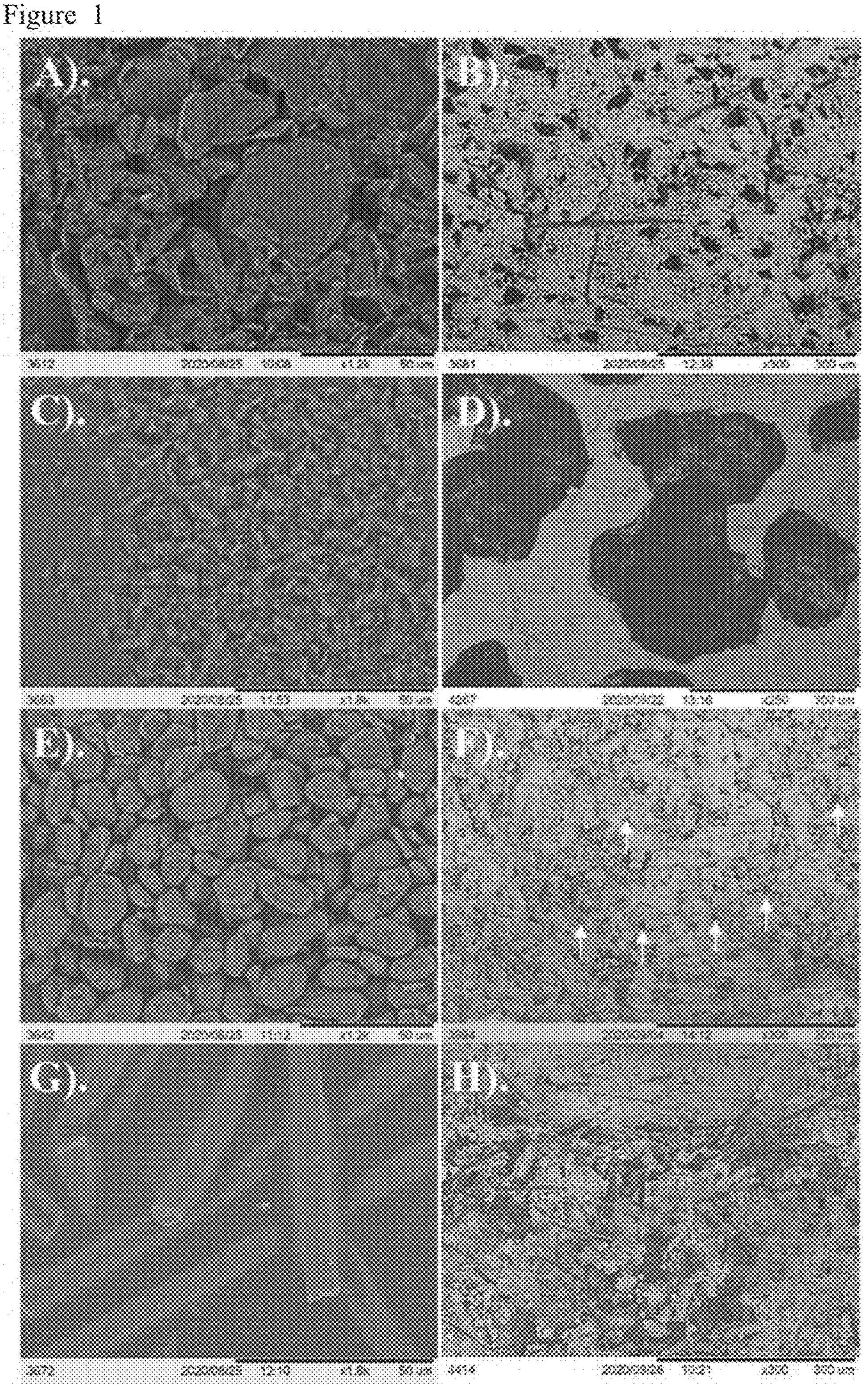

Micrographs of each of the graphite additives were taken and are set forth in FIG. 1. LBG 2025, LBG 8004, and SLC 1520P powders are shown in micrographs A, C, and E and felt fibers are shown in G. B, D, F, and H show the respective graphite additive with inclusion into a PAM (4.4 vol. %). In micrograph F, several 1520P particles are noted by white arrows.

The LBG 2025 and 8004 particles are anisotropic flakes. LBG 2025 had a larger median particle size and a broader particle size distribution than LBG 8004. The surface of the SLC 1520P particles were noticeably rough, possibly due to the amorphous coating. The felt had the largest size irregularities but was uniform in width of about 10 μm. The felt fibers had a vein structure made of individual smaller fibers and narrow voids running parallel to the main axis.

Figure 2:
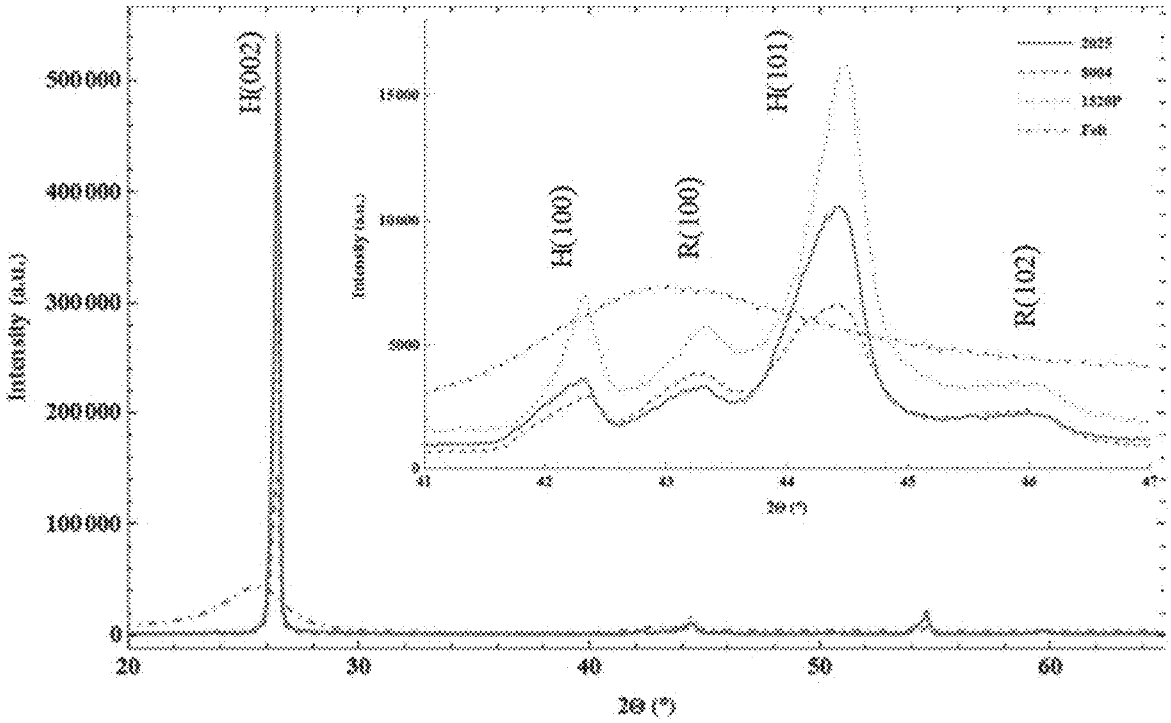

The XRD patterns of the four graphite additives above are set forth in FIG. 2, including an inset at 41-47° 2θ to highlight the variances in rhombohedral (R) and hexagonal (H) phases. The XRD patterns were characterized by a sharp (002) peak at around 26° 2θ. The felt fiber had a very broad (002) peak with low intensity, signifying low range graphitic order. The rhombohedral to hexagonal phase ratio was determined from the (101) plane for each phase located at 43.30° and 44.44° 2θ, respectively. The felt did not present distinguishable planes and thus the ratio was not determined. The extent of the rhombohedral phase increased in the following order: SLC 1520P<LBG 2025<LBG 8004. The relative amount of rhombohedral to hexagonal phases is thought to be a qualitative indicator of the amount of structural defects. The relative amount of rhombohedral to hexagonal phases is typically indirectly correlated to the graphite particle size. For example, discharge capacities may increase with more rhombohedral phase in the graphitic anode, because the graphite is less vulnerable to exfoliation from co-intercalated solvents. Conversely, hexagonal graphite is very sensitive to exfoliation.

Figure 3:
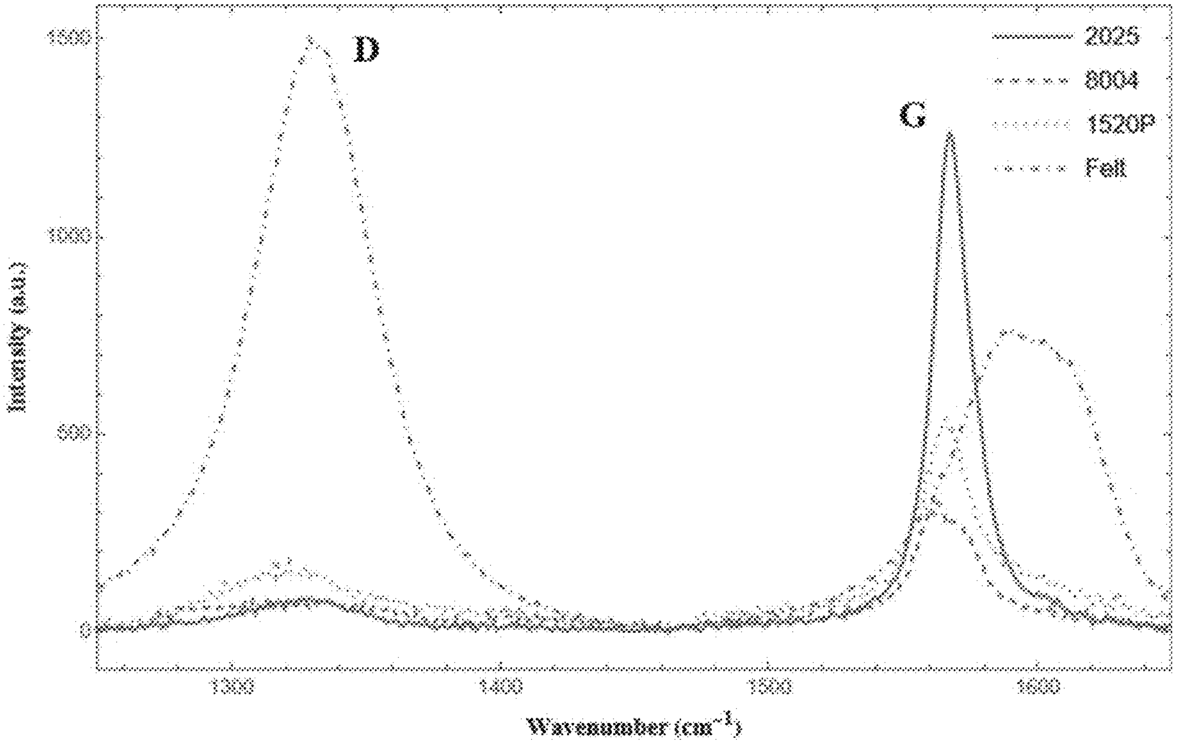
FIG. 3 shows the intensity of D and G-Raman peaks for various graphite additives.

The quality of the graphite can be inferred from the intensity ratio of the characteristic D to G-Raman peaks ($I_D/I_G$). Single crystals of graphite contain one G-peak at approximately 1575 $cm^{-1}$. For less pure commercial graphite, a D-peak typically shows approximately 1355 $cm^{-1}$. The intensity of the G-peak represents the perfection of the graphite crystal lattice, and the intensity of the D-peak reflects the disorder of the graphite lattice. A weak broad band that may appear between the D and G-peaks approximately 1500 $cm^{-1}$ is correlated to the amorphous structures of carbon. As can be seen in FIG. 3, some amorphous carbon was detected on the surface of the graphite additives, with felt and SLC 1520P showing slightly higher intensities approximately 1520 $cm^{-1}$. The D-peaks for all four graphite additives were observed at approximately 1326 $cm^{-1}$. For the G-peak, the felt fiber experienced an almost 25 $cm^{-1}$ down-shift, compared to the location of the other additives at approximately 1565 $cm^{-1}$. Using the peak intensity ratios of the D and G-bands, the amount of ordered graphitic domains were estimated. LBG 2025 had the highest degree of structural order followed by LBG 8004 and SLC 1520P. The structural order of felt fiber was almost an entire order of magnitude lower than that of LBG 2025. From the further data discussed below it was determined that the estimated graphitic order had a direct correlation to the PAM utilization.

Example 2—Preparing Battery Paste Composition

An experiment was conducted to prepare a battery paste composition. Paste ingredients were mixed in a 250 mL closed container using a vigorous shaker. Acid was added with a micropipette from a small insertion on the side of the container. Both positive and negative paste recipes were prepared for a calculated wet paste density of 4.25 $g \cdot mL^{-1}$.

The negative paste composition consisted of 11.75 g deionized water, 8.75 g of 1.40 s.g acid, and 1.25 g of an expander mix comprising barium sulfate, sodium lignin-sulfonate, and carbon black. There was no glass microfiber added.

In the positive paste composition, the paste ingredients were mixed in the following order: 0.50 g of glass microfiber (commercially available from H&V, East Walpole, MA), 13.8 g of deionized water, 100 g of barton-pot lead oxide (commercially available from Omni Oxide LLC, Indianapolis, IN) with 25 wt. % free lead, and 6.10 g of 1.40 specific gravity (s.g.) sulfuric acid added at a rate of 0.500 $mL \cdot min^{-1}$ (Table 1). The slow addition of acid assured the paste mixing temperature never exceeded 60° C., as to maintain a predominately tribasic lead sulfate paste (3BS).

At the end of the mixing process, graphite additives were added into the freshly made positive paste composition in amounts ranging from 0.73 to 4.40 g, resulting in between 0.55 and 8.80 vol. % of graphite additive in the wet paste. A summary of the positive paste composition is set forth in Table 3 below.

TABLE 3

| Positive paste composition | Glass microfibers | DI water | Leady oxide | Sulfuric acid (1.40 s.g.) | Graphite additive (vol. %) 0.55 | 2.20 | 4.40 | 6.60 | 8.80 |
|---|---|---|---|---|---|---|---|---|---|
| Amount (g) | 0.50 | 13.8 | 100 | 6.10 | 0.73 g | 1.47 g | 2.93 g | 4.40 g | 5.86 g |

Example 3— Plating and Curing of Paste Composition

Plates for a battery comprising cast-rolled Pb-0.8% Sn grids (commercially available from NorthStar Battery, Springfield, MO) were pasted with the battery paste compositions of Example 2 on both sides. The positive plate had a thickness of approximately 2.20 mm and the negative plate had a thickness of about 1.60 mm. After the plates were pasted with the battery paste composition, the plates were cured in 85% relative humidity at 65° C. for 24 hours and subsequently dried without humidity at 65° C. for another 24 hours.

Example 4—Preparing Batteries

Batteries were assembled in a sealed airtight polystyrene petri dish using a three-plate design having one positive plate between two negative plates. A polypropylene check-valve with a cracking pressure of 3.45 kPa was installed at the top of the test cell as a vent. Six absorptive glass mat (AGM) separators were utilized when arranging the battery, and the battery cells were flooded with 4.990 to 5.305 mL of 1.28 s.g. acid, maintaining a 2:1 molar ratio of acid to PAM.

The assembled batteries were then allowed to soak for 30 min. After the soaking period, a two-step current jar formation sequence was undertaken wherein the batteries were supplied with 220% Ah of the theoretical capacity of the positive plate. The first 20% of the formation capacity was supplied under a lower current of 2 mA, and the remaining 200% of the formation capacity was supplied under a higher current of 20 mA.

Figure 4:
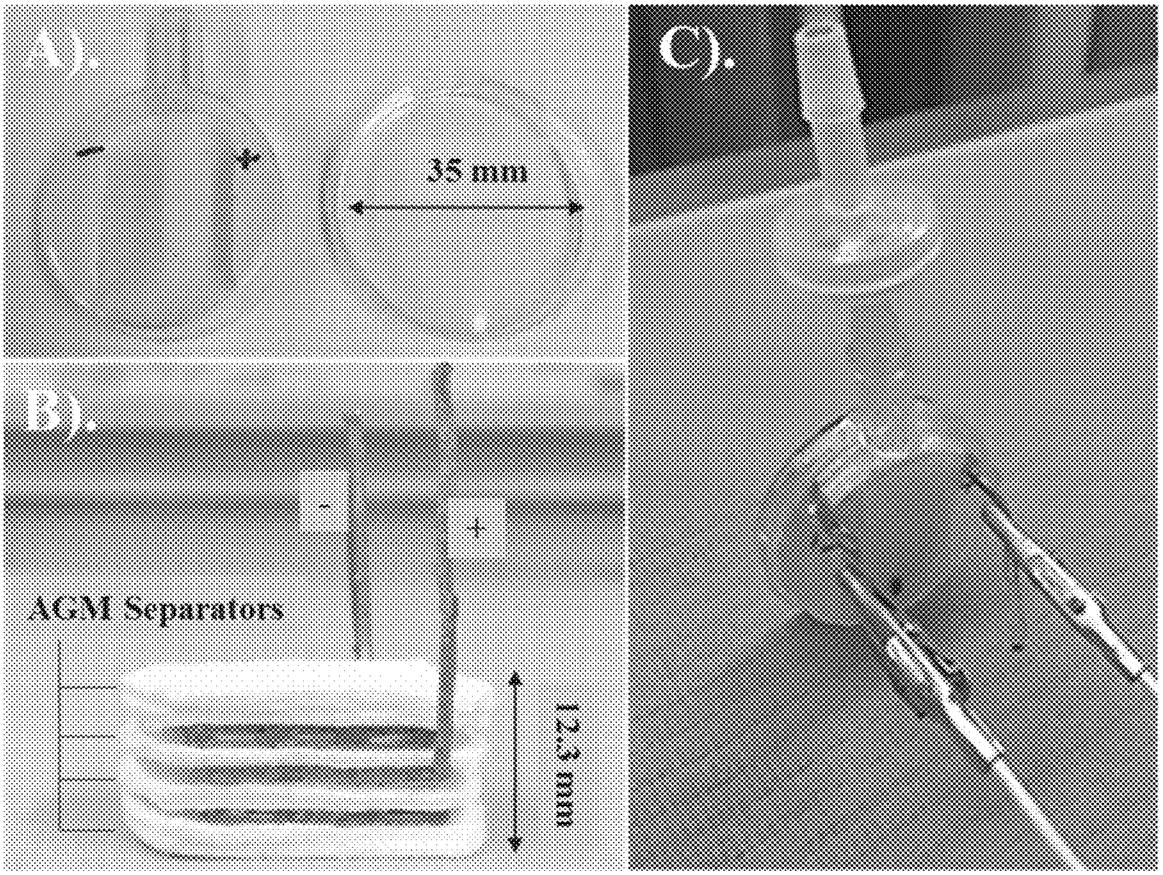
FIG. 4 illustrates a 2V test cell design.

FIG. 4 illustrates a 2V test cell design constructed under this example.

Example 5—PAM Utilization

The efficiency of formation of batteries prepared in accordance with Example 4 was measured by an initial C/10 (based on 50% PAM utilization) discharge to 1.80 V. The results of this testing for various graphite additives is set forth in FIG. 5.

Graphite flake additives LBG 2025 and LBG 8004 provided the greatest enhancement—up to 20 and 17% at the highest loading of 6.6 vol. %, respectively. The graphite flakes had a higher aspect ratio than the globular SLC 1520P. Therefore, without being bound by the theory, it was believed that the graphite flakes were able to more successfully incorporate links between the current collector and the PAM structure and provide numerous points of contact.

A conditioning cycle sequence was used to stabilize the structure of the PAM, convert any unformed material, and test the initial cycling effects of graphite additives inside the PAM. Batteries with graphite additives were found to have reached their rated C capacity sooner compared to the control samples. FIG. 6 illustrates the end-of-discharge voltage at the C-rate as a function of number of conditioning cycles compared for each graphite additive type and amount. For each progressive addition of graphite, the amount of conditioning cycles needed to reach the rated C capacity decreased and the end of discharge voltage increased. These enhancements are believed to have resulted from improved formation efficiency. At the end of the twenty-five cycles, the control and graphite samples reached similar performances.

Detrimental effects were observed for samples containing excess graphite additive, such as samples with 6.6 vol. % LBG 8004 and 8.8 vol. % SLC 1520P. In these samples, the voltage never stabilized and began to decrease with continued cycling. However, such elevated amounts of graphite additives were not detrimental when utilizing LBG 2025.

The least effective graphite additive was the felt. Samples with 4.4 vol. % felt additive followed a similar conditioning trend as the control samples. Only when mixed with LBG 2025, did the samples reach their rated C capacity quicker and end at higher discharge voltages.

Finally, a range of discharge rates, from C/20 to 8C, were used to evaluate the PAM utilization of various graphite additives. The results of these experiments are set forth in FIGS. 7*a*-7*d*.

Compared to the control cells, the C/10 PAM utilization was improved by 13% using LBG 2025 at 2.2 vol. % and the 2C utilization was improved by 15% with a 4.4 vol. % loading. The samples containing LBG 8004 and SLC 1520P increased the 2C utilization by 14% and 7%, respectively, at a 4.4 vol. % loading.

Similarly, as noticed in the formation and conditioning cycle stages, felt fibers did not noticeably impact PAM utilization. When the felt fibers were added at 4.4 vol. %, the low and high rate utilization coefficients remained comparable to that of the control samples. The PAM utilization improved when mixing equal parts of 2.2 vol. % LBG 2025 and felt fiber. However, the performance did not change drastically when compared to the samples containing only 2.2 vol. % of LBG 2025.

Example 6— Pore Volume and Size Distribution

To conduct further testing, the formed PAM were washed in DI water thoroughly to remove acid, and then dried at 40° C. in a vacuum oven for 24 hours. Samples were then prepared for further analysis by gently detaching the electrode material from the grid wires, keeping as many larger pieces intact as possible.

The pore volume and size distributions of the PAM were measured using mercury porosimetry (e.g., Micrometrics AutoPore IV mercury intrusion porosimeter).

The best performing graphite additive (LBG 2025) was compared with the least effective graphite additive (SLC 1520P) at 2.2 vol. % by measuring porosity and pore size distribution using mercury porosimetry. The results confirmed that graphite additives increase the total pore volume of the formed positive material. For both LBG 2025 and SLC 1520P, the total pore volume of the cured plate did not change. The results of this evaluation are shown in FIG. 8.

Without being bound by the theory, it is believed that the porosity enhancement is attributed to the graphite's expansion behavior. As shown in FIG. 9, the LBG 2025 (A) and SLC 1520P (B) exhibited graphite expansion shown by the white outlining, while the felt fibers (C) showed no expansion, possibly explaining why no capacity benefits were detected for the felt fibers.

The expansion of the PAM pore volume caused by graphite, although helpful at high discharge rates, can result in adverse effects at lower discharge rates. The expansion of graphite may push connecting particles apart, thus impairing mechanical integrity and lowering electronic conductivity of the PAM structure. Therefore, a balance must be struck between expansion of graphite and its adverse effects. LBG 2025 was found to maintain the benefits of a more porous PAM without sacrificing lower rate capacity.

Example 7— Thermal Analysis

Thermal analysis was also performed on the formed PAM with a TA Instruments Q600 SDT Thermogravimetric Analyzer (TGA) & Differential Scanning calorimeter (DSC). The PAM material on the surface of the positive plate was washed in DI water thoroughly to remove acid, and then dried at 40° C. in a vacuum oven for 24 hours. Samples were then prepared for further analysis by gently detaching the electrode material from the grid wires, keeping as many larger pieces intact as possible. Prior to thermal analysis, the PAM material on the positive plate was ground into fine powder with a mortar and pestle. All measurements were carried out with pure nitrogen at a gas flow rate of 80 $mL \cdot min^{-1}$ and a heating rate of 10° $C. \cdot min^{-1}$. The scan was conducted from room temperature to 350° C.

FIG. 10 shows the weight loss as a function of temperature for different PAMs at a concentration of 4.4 vol. %.

FIG. 11 illustrates the DSC curves of the PAM with the addition of different graphite additives at a concentration of 4.4 vol. %. Physisorbed water was removed from the PAM up to about 60° C. (first exothermic peak). The second exothermic peak spans from 60 to about 145° C. The third peak spans from 145° C. to about 250° C. These ranges correspond to the release of water and hydroxyl groups from the hydrated or gel parts of the PAM. The amount of gel zones directly correlates with the rates of performances measured.

Example 8— Comparison of Expanded and Natural Flake Graphite

A series of experiments were conducted to evaluate the differences between an expanded flake graphite additive (i.e. ABG 1005 and ABG 1045) and a natural flake graphite additive (i.e. LBG 2025). The graphite additives had the properties set forth below in Table 4. $I_D/I_G$ represents the degree of order of graphitic domains determined from Raman spectra (i.e. the ratio of amorphous to graphitic domain peak intensities).

TABLE 4

| Graphite Name | ABG-1005 | ABG-1045 | LBG-2025 |
|---|---|---|---|
| Graphite Type | Expanded | Expanded | Natural flake |
| Specific Surface Area ($m^2 \cdot g^{-1}$) | 22.58 | 18.49 | 4.02 |
| Graphitization (%) | 80-83 | 69-92 | 79 to 84 |
| Crystallite Size ($L_C$) (nm) | 19.10 | 20.83 | 37.63 |
| Graphene Stack Thickness (# layers) | 55 to 59 | 53 to 71 | 99 to 125 |
| $I_D/I_G$ | 0.141 | 0.071 | 0.028 |

SEM (scanning electron microscope) images of each of the graphite additives were taken and are set forth in FIG. 12. ABG-1005 is shown in images A and B, ABG-1045 is shown in images C and D, and natural flake graphite powder LBG-2025 is shown in image E and F.

Example 9— Analysis of Graphite Additives after Battery Cell Formation

FIG. 13 shows the effect of graphite additives on the microstructural development of the PAM after battery cell formation. Images A and B correspond to a PAM without a graphite additive. Images C and D correspond to graphite additive ABG-1005. Images E and F correspond to graphite additive ABG-1045. Images G and H correspond to graphite additive LBG-2025. White-dotted circles are included where appropriate to assist in distinguishing the graphite particles inside the PAM.

The PAM without graphite additives had microporous branches that were agglomerated and interconnected to form larger macro pores. A similar micro/macro arrangement of the pores could be discerned from the images containing graphite additives. It was observed that the graphite additives did not degrade after the formation process but were homogenously distributed and incorporated. The PAM with the smallest expanded graphite particles (ABG-1005) contained agglomerated particles of about 20 μm. The largest expanded graphite particles (ABG-1045) showed small fissures in the PAM propagating from the graphite particles. Similar features could be distinguished with the LBG-2025 natural flake graphite. A slight separation of graphite stack layers was also visible with the LBG-2025 natural flake graphite, possibly indicating graphite expansion inside the PAM Battery cells were prepared in accordance with the procedure of Example 4 having 2.20 vol. % of a graphite additive. The initial C/10 PAM utilization was used to determine the efficiency of the PAM formation. The end-voltages for twenty-five C-rate conditioning cycles for batteries with and without graphite additives were also evaluated. The results are set forth in FIG. 14 in graph (A) and (B), respectively. In graph (B), samples which did not reach their C-rated capacity exhibited an end-voltage of 1.70 V.

PAM with expanded (ABG-1045) and natural flake (LBG-2025) graphite had an average C/10 utilization greater than that of the control sample without graphite additives.

The beneficial effects of graphite additives inside the PAM with respect to the conditioning cycles can be clearly seen. Samples with ABG-1045 and LBG-2025 reached their stable end-voltage value at around 10 cycles; whereas the control and ABG-1005 samples stabilized at around cycle 20. As would be expected, the batteries with a higher initial C/10 capacity, and consequently better formed PAM, also reached their C-rated capacity sooner. Ultimately, the conditioning cycles improved the C/10 utilization to 44, 39, 48, and 50% for the control, ABG-1005, ABG-1045, and LBG-2025 batteries, respectively. Thus, all cell performances improved and reached a similar stable end-voltage A complete depth-of-discharge (DoD) at various discharge rates was conducted from C/20 to 8C to determine the PAM utilization performance. The results are set forth in FIG. 15. Compared to the control cells, ABG-1045 improved the C/20, C/10, and C utilizations by 6, 9, and 7%, respectively; natural flake improved these rate performances by 10, 13, and 11%, respectively.

Example 10— Characterization of PAMs Formed Using Graphite Additives

The cumulative pore volume was compared between the control (no graphite addition), expanded graphite, and natural flake graphite containing PAMs. The results are set forth in FIG. 16. It was observed that the PAMs containing ABG-1045 and LBG-2025 graphite additives had significantly higher total pore volume compared to the control. The total pore volume for the control PAM was 0.132 $mL \cdot g^{-1}$, while the expanded ABG-1045 and natural flake graphite LBG-2025 were 0.156 and 0.163 $mL \cdot g^{-1}$, respectively. The total pore volume of PAM containing ABG-1005 was 0.105 $mL \cdot g^{-1}$. Porosity results, shown in FIG. 16, indicated that ABG-1005 graphite expanded the least and LBG-2025 graphite expanded the most.

The porosity of the PAM was shown to be impacted by modifying the graphite additive utilized. It was determined from FIG. 17 that higher PAM pore volume directly increases the PAM utilization performance. Across a wide range of discharge rates (4C to C/20), a strong linear fit was found between the PAM utilization and the measured PAM pore volume. It was theorized that the transport distance is shortened in a higher pore volume plate, as more acid can infiltrate the plate before discharge as well as be resupplied during the reaction.

Pore size distribution of the PAM was also compared between the different graphite additives as shown in FIG. 18. The control PAM and the PAM containing ABG-1045 and LBG-2025 graphite shared similar pore distribution trends. The best performing graphite additives increased the PAM volume of the larger pores above ~5 μm, while not significantly affecting the volume of pores smaller than ~5 μm. Pores above 0.1 μm serve as the main transport system for bisulfate ions and water inside the PAM. Additionally, larger pore sizes were thought to facilitate acid supply inside the plate during discharge, evading pore blocking effects of $PbSO_4$. The natural flake graphite formed 0.00833 $mL \cdot g^{-1}$ more volume of pores above 5 μm than the expanded graphite. Natural flake graphite generated greater PAM pore volume than expanded graphite, thus better improving PAM utilization.

Raman spectroscopy, as shown in FIG. 19, was used to confirm the structural order on the graphite surface. A G-band located at ~1580 $cm^{-1}$ corresponded to the in-plane vibrations of $sp^2$ domains, and a D-band located at ~1330 $cm^{-1}$ corresponded to $sp^3$ carbons in out-of-plane vibrations. An increasing D' band also appeared for the expanded graphite at ~1610 $cm^{-1}$. The D and D' are symmetry-breaking spectral features found in defective graphene surfaces that are characteristically filled with boundaries, edges, and point defects. The ratio $I_D/I_G$ was used to characterize the degree of graphitic order. As shown in FIG. 20, natural flake graphite demonstrated a slightly higher degree of order than ABG-1005 and ABG-1045. A higher defect density for expanded graphite could be correlated with the wrinkled morphology and stacking faults caused by the expansion process.

The graphite defect ratio is set forth in FIG. 20. Ultimately, low defect density could be correlated with high PAM utilization performance. It is believed that the ease of sulfuric acid penetration and intercalation between graphene layers significantly increased for higher ordered crystalline graphite. In the case of the expanded graphite (ABG-1045), less acid penetration and intercalation would lead to less expansion in the PAM and consequently could explain lower PAM pore volume enhancement.

Example 11: Battery Paste Composition Comprising a Dispersant

An experiment was conducted to evaluate the impact of certain dispersants on the rheological properties of a battery paste composition.

A battery paste composition was prepared utilizing varying amounts of a sodium polymethacrylate dispersant—DARVAN-7N (commercially available from R.T. Vanderbilt Company, Norwalk, CT) as set forth in Table 5 below. DARVAN-7N is a solution comprised of 25 wt. % polymer and 75 wt. % water. The weight percentage of DARVAN-7N is reported based on the total leady oxide concentration of the battery paste composition. The sulfuric acid solution was added slowly in increments of 0.7 g.

TABLE 5

| Order | Paste Ingredient | |
|---|---|---|
| | | Amount (g) |
| 1 | Glass microfiber | 0.50 |
| 2 | Deionized water | 13.80 |
| 3 | Leady Oxide | 100.00 |
| 4 | Sulfuric Acid Solution ($1.40\ g \cdot cm^{-3}$) | 6.10 |
| | | Wt. % (w.r.t. leady oxide) |
| 5 | DARVAN-7N | 0.00 |
| | | 0.02 |
| | | 0.12 |

The density of the resulting battery paste compositions were tested by packing the paste inside a known cylindrical volume of 8.76 mL and weighing. The densities are set forth in Table 6 below, with a standard deviation of approximately 0.25 $g \cdot mL^{-1}$. It was determined that in concentrations as high as about 0.12 wt. % (based on the total leady oxide concentration of the paste), the DARVAN-7N dispersant did not noticeably impact the density of the battery paste composition.

TABLE 6

| Wt. % (w.r.t. leady oxide) | Density ($g \cdot cm^{-3}$) |
| --- | --- |
| 0.00 | 4.17 ± 0.25 |
| 0.02 | 4.17 |
| 0.12 | 4.21 |

It was observed that progressive addition of DARVAN-7N noticeably impacted the texture and flowability of the battery paste composition. Generally, cracks on the surface of the paste merged and detached pieces of paste came together into one smooth body. Accordingly, the paste became smoother and better flowing with the addition of DARVAN-7N. When applying these compositions to a battery plate, it was determined that less force was required to manually apply the battery paste composition.

Example 12: Testing of Rheological Properties

The rheological properties of the battery paste compositions prepared in accordance with the procedure of Example 11 were measured using a concentric four-blade vane and sandblasted cylinder geometry in an Anton Paar 302 rheometer at a constant temperature of 20° C. The stirrer was positions such that at least about 25 mm of the paste composition was present above the top of the stirrer. This ensured that any drying of the battery paste composition exposed to the environment did not significantly impact the measurements. Two different experiments were employed to measure the effect of DARVAN-7N on the flow of the battery paste composition. The first test comprised a stress growth test conducted by applying a constant shear rate of 0.1 $s^{-1}$ for 200 seconds. The results of the stress growth test are reported in plot A of FIG. 21 as the average of five stress-time curves (bold) with a corresponding 95% confidence interval (highlighted) at a constant shear rate of 0.1 $s^{-1}$. Plot B of FIG. 21 shows a logarithmic scale of the results over time. As the amounts of DARVAN-7N increased from 0.02 to 0.06 and 0.10 wt. %, the yield stress was lowered to about 10000, 8000, and 6000 Pa, respectively, compared to the yield stress of the control paste of about 12000 Pa.

Next an oscillatory strain amplitude sweep was performed from $1\times10^{-1}$ to $1\times10^{3}$ percent at a rate of 1 decade per 3 min and oscillation frequency of 1 Hz. By oscillating the vane at a constant frequency, the complex shear modulus (G), calculated as the ratio of the resulting stress to the applied strain, can be separated into its storage (G') and loss (G") components. The linear viscoelastic region (LVE) can be defined as the region with a constant G' value and is thought to indicate the range of strain in which the structure of the paste remains intact. The shear stress at which the linearity of the LVE starts to deviate can be defined as the yield point. After reaching the yield point, both G' and G" decrease with a further increase in strain, indicating changes in the structure of the paste. As G' is still larger than G", the behavior is still predominantly elastic. The crossover point, at which G'=G" indicates the transition from predominantly elastic to predominantly viscous behavior. Due to the suspected formation of a shear plane beyond the yield stress, the data beyond the crossover point are not deemed reliable. Oscillatory tests were performed with an increasing strain ramp to avoid the consequence at low strain values of a preferential shear plane near the blade edge, formed at high strain values. The results are set forth in FIG. 22.

As shown in plot A of FIG. 22, the LVE region shortens, and the paste network begins to fracture, at lower strain values with an increased dosage of DARVAN-7N. The flow point of the tested DARVAN-7N amounts was determined to be at approximately the 50% amplitude strain point. This point corresponded with a total shear stress that was lowered from about 2100 Pa (i.e. the control measurement) to about 1150 Pa or lower.

In sum, the oscillatory strain amplitude sweep showed the effects of DARVAN-7N on shortening the LVE strain region and lowering the yield point stress values.

Example 13: Battery Testing

Battery paste compositions of Example 11 comprising 0.02 and 0.12 wt. % DARVAN-7N were hand pasted onto a battery plate. 2V cells were built according to a positive material limited design (2 negatives, 1 positive) with excess volume of filling acid completely absorbed into six glass separator mats (AGM). Two mats were placed on both the bottom and top of the cell stack, and two single mats separated the cathode from the anodes. Polystyrene petri-dishes were used as the battery case, assuring approximately a 23% compression by height. The batteries were sealed air-tight, and a check valve was used with 3.45 kPa cracking pressure.

After acid filling of the batteries, the batteries were soaked for a fixed duration in acid before the formation current was initiated. Two constant currents (0.002 and 0.02 A) were used for a jar formation procedure, followed by a C/10 initial cycle, and twenty-five shallow C-rate conditioning cycles. After these steps, the final battery capacity measured under various discharge rates of C/20, C/10, C, 2C, 4C, and 8C.

Following the capacity measurements, the cycle life was tested under 2C discharge conditions. The cycling protocol consisted of discharging at 0.25 hours and charging at C/3.5 rate for 1 hour. The end-of-life was determined when the end-of-discharge voltage of the battery fell below 1.70 V. In order to monitor the capacity degradation of the batteries, every 200-cycle interval, the batteries were fully discharged to 1.80 V at the C/10 rate and to 1.70 Vat the C rate.

The cycle life of a battery is limited by the mechanical integrity of the PAM (cracks between the $PbO_2$ clusters and spallation at the grid interface). As the PAM discharges to $PbSO_4$, the molar volume increase by nearly 50%. The expansion of the PAM during discharge isolates unreacted $PbO_2$ as well as inhibits supply of acid to inner parts of the plates.

The capacity performance was evaluated every 400-cycle interval, as shown in FIG. 23 for C/10 and FIG. 24 for C specific capacities. The 0.02 and 0.12 wt. % DARVAN-7N compositions were noted as "DN7 (0.02 wt. %)" and "DN7 (0.12 wt. %)" respectively. The capacity degradation of the batteries was tracked with the number of total cycles.

After 2000 cycles (i.e. over a 5-month testing period), both control and DARVAN-7N samples had not yet reached their fully discharged state condition. The samples had degraded at approximately a similar rate. The C/10 rate specific capacities decreased from about 0.29 to 0.22 $Ah\cdot g^{-1}$; the C rate decreased from 0.21 to 0.17 $Ah\cdot g^{-1}$. The addition of DARVAN-7N to the positive battery paste composition did not appear to alter the cycle life or rate of battery degradation.

Example 14: PAM Utilization of a Battery

The batteries of Example 13 were also tested for the PAM utilization. The 2V batteries were discharged in a wide range of low to high current rates, to evaluate the effects of DARVAN-7N on the PAM utilization in different discharge conditions.

The PAM utilization results are set forth in FIG. 25. The results demonstrate that compositions comprising 0.02 and 0.12 wt. % of DARVAN-7N (i.e. noted in the figure as "DN7 (0.02 wt. %)" and "DN7 (0.12 wt. %)", respectively) had no noticeable effects on the PAM discharge mechanism. Thus, neither the electrolyte transport within the electrode structure nor the effective conductivity of the PAM were lowered with the addition of DARVAN-7N. This signified that DARVAN-7N addition does not impact lead-acid battery discharge performance and may be utilized for its successful flow enhancing additive properties discussed above.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description shall be interpreted as illustrative and not in a limiting sense.

The invention claimed is:

1. A lead-acid battery comprising a positive battery plate having a battery paste composition adhered thereto, the battery paste composition comprising an active material and a graphite additive;

wherein the graphite additive is selected from the group consisting of:

anisotropic graphite having a specific surface area of from about 0.5 to about 20 $m^2/g$ and a median particle size from about 10 μm to about 30 μm;

expanded flake graphite having a specific surface area of from about 10 to about 20 $m^2/g$ and an average particle size of from about 30 μm to about 50 μm;

and combinations thereof;

wherein the graphite additive comprises a degree of graphitic order (calculated by the ratio of amorphous to graphitic domain peak intensities $$\frac{I_D}{I_G}$$

determined from Raman spectra) of less than about 0.08.

2. The battery of claim 1, wherein the discharge utilization of the positive active material (PAM) of the battery, as defined by the formula $$\frac{\text{Measured Capacity}}{\text{Stoichiometric Capacity}} \times 100$$

at the initial C/10 discharge, is about 40% or greater.

3. The battery of claim 1, wherein the discharge utilization of the positive active material (PAM) of the battery is about 45% or greater.

4. The battery of claim 1, wherein the discharge utilization of the positive active material (PAM) of the battery is about 5% greater than the discharge utilization of the positive active material (PAM) of an otherwise identical comparative battery in which the one or more battery plates do not have the battery paste composition comprising a graphite additive adhered thereto.

5. The battery of claim 1, wherein the graphite additive comprises the expanded flake graphite and the expanded flake graphite is prepared by a process comprising:

purifying natural flake graphite in an inert atmosphere to achieve a 99.9% carbon flake graphite material;

oxidizing and intercalating the flake graphite material in a sulfuric acid solution to prepare a flake graphite intermediate; and drying and air milling the flake graphite intermediate to produce the expanded flake graphite.

6. The battery of claim 1, wherein the graphite additive comprises a degree of graphitic order (calculated by the ratio of amorphous to graphitic domain peak intensities $$\frac{I_D}{I_G}$$

determined from Raman spectra) of less than about 0.07.

7. The battery of claim 1, wherein the graphite additive comprises the anisotropic graphite and the anisotropic graphite comprises particles having a median particle size of from about 15 μm to about 30 μm.

8. The battery of claim 1, wherein, the graphite additive comprises the anisotropic graphite and the anisotropic graphite has a specific surface area of from about 1 to about 20 $m^2/g$; and/or the graphite additive comprises the expanded flake graphite and the expanded flake graphite has a specific surface area of from about 11 to about 20 $m^2/g$.

9. The battery of claim 1, wherein the total pore volume of the positive active material (PAM) of the battery plate having a battery paste composition adhered thereto is about 0.14 ml/g or greater.

10. The battery of claim 1, wherein the battery paste composition comprises the graphite additive in a concentration of less than about 7.0 vol. %.

11. The battery of claim 1, wherein the battery paste composition further comprises glass.

12. The battery of claim 11, wherein the glass comprises glass microfiber.

13. The battery of claim 1, wherein the graphite additive comprises the expanded flake graphite and the expanded flake graphite has an average particle size of from about 35 μm to about 50 μm.

14. The battery of claim 1, wherein the graphite additive comprises the expanded flake graphite and the battery paste composition comprises the graphite additive in a concentration of less than about 7.0 vol. %.

15. The battery of claim 1, wherein the graphite additive comprises the anisotropic graphite and the battery paste composition comprises the graphite additive in a concentration of less than about 4.4 vol. %.

16. The battery of claim 1, wherein the graphite additive comprises a degree of graphitic order (calculated by the ratio of amorphous to graphitic domain peak intensities $$\frac{I_D}{I_G}$$

determined from Raman spectra) of less than about 0.06.

* * * * *